(12) United States Patent
Wang et al.

(10) Patent No.: US 6,570,922 B1
(45) Date of Patent: May 27, 2003

(54) RATE CONTROL FOR AN MPEG TRANSCODER WITHOUT A PRIORI KNOWLEDGE OF PICTURE TYPE

(75) Inventors: Limin Wang, San Diego, CA (US); Ajay Luthra, San Diego, CA (US); Robert O. Eifrig, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/198,867

(22) Filed: Nov. 24, 1998

(51) Int. Cl.$^7$ ............... H04N 7/12; H04N 11/02; H04N 11/04
(52) U.S. Cl. ............... 375/240.12; 375/240.13
(58) Field of Search ............... 348/415, 419, 348/404, 411; 375/240, 240.12, 240.13

(56) References Cited

U.S. PATENT DOCUMENTS

| | | | |
|---|---|---|---|
| 5,477,397 A | | 12/1995 | Naimpally et al. |
| 5,617,142 A | | 4/1997 | Hamilton |
| 5,619,733 A | | 4/1997 | Noe et al. |
| 5,742,343 A | * | 4/1998 | Haskell ............ 348/415 |
| 5,847,761 A | * | 12/1998 | Uz ............ 348/404 |
| 5,923,814 A | | 7/1999 | Boyce |
| 5,929,916 A | * | 7/1999 | Legall ............ 348/419 |
| 5,933,500 A | | 8/1999 | Blatter et al. |
| 5,986,712 A | * | 11/1999 | Peterson ............ 348/411 |
| 6,115,420 A | * | 9/2000 | Wang ............ 375/240 |

FOREIGN PATENT DOCUMENTS

| | | |
|---|---|---|
| EP | 0 627 854 | 12/1994 |

OTHER PUBLICATIONS

G. Keesman, et al., "Transcoding of MPEG bitstreams," Signal Processing: IMAGE Communication, vol. 8, pp. 481–500, 1996.

Björk, Niklas et al., "Transcoder Architectures for Video Coding," IEEE Transactions on Consumer Electronics, vol. 44, No. 1, Feb. 1998, pp. 88–98.

Staff of Cable Television Laboratories Inc., "Digital TV Solutions," From the Labs: Cable World, Feb. 1, 1999.

Gebeloff,Rob., "The Missing Link," http://www.talks.com/interactive/misslink–x.html.

Boyce, J.M., "Data Selection Strategies for Digital VCR Long Play Mode," *Digest of Technical Papers for the International Conference on Consumer Electronics*, New York, Jun. 21, 1994, pp. 32–33.

*ISO/IEC/JTC1/SC29/WGII*, MPEG Test Model 5, Section 10—Rate Control and Quantization Control, Apr. 1993, pp. 61–65.

* cited by examiner

*Primary Examiner*—Chris Kelley
*Assistant Examiner*—Charles Parsons
(74) *Attorney, Agent, or Firm*—Barry R. Lipsitz; Douglas M. McAllister

(57) ABSTRACT

A rate control system suitable for use with a digital video transcoder, such as one conforming to the MPEG standard. The proposed rate control system starts coding with any reasonable set of assumed Group of Pictures (GOP) parameters, thereby avoiding a processing delay of about one GOP which would otherwise be incurred to extract the complete GOP structure information from a pre-compressed bit stream. In addition, the system avoids the need to store the data corresponding to the GOP, thereby reducing the memory required for transcoding. Encoding of a first picture in a sequence or GOP begins without a priori knowledge of the picture type of subsequent pictures. A reasonable set of GOP parameters is assumed to determine an encoding bit budget. The bit budget is gradually corrected as successive pictures are coded according to their picture types. Changes in the GOP structure of pre-compressed bitstreams can be addressed, for example, when switching channels, inserting commercials, and the like. Target rates with incorrect starting GOP parameters will converge within a few GOPs.

22 Claims, 16 Drawing Sheets

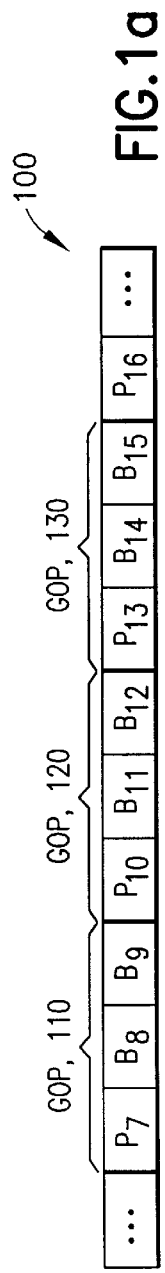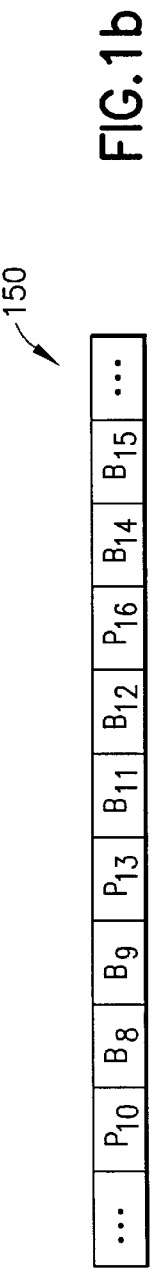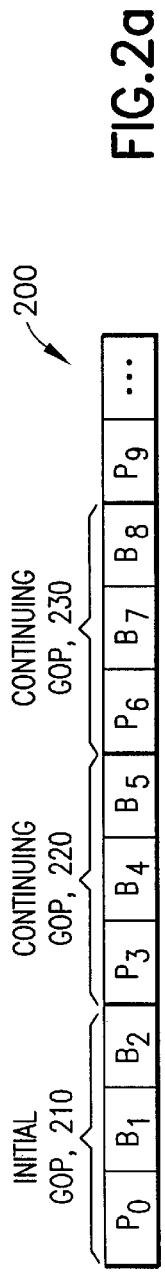

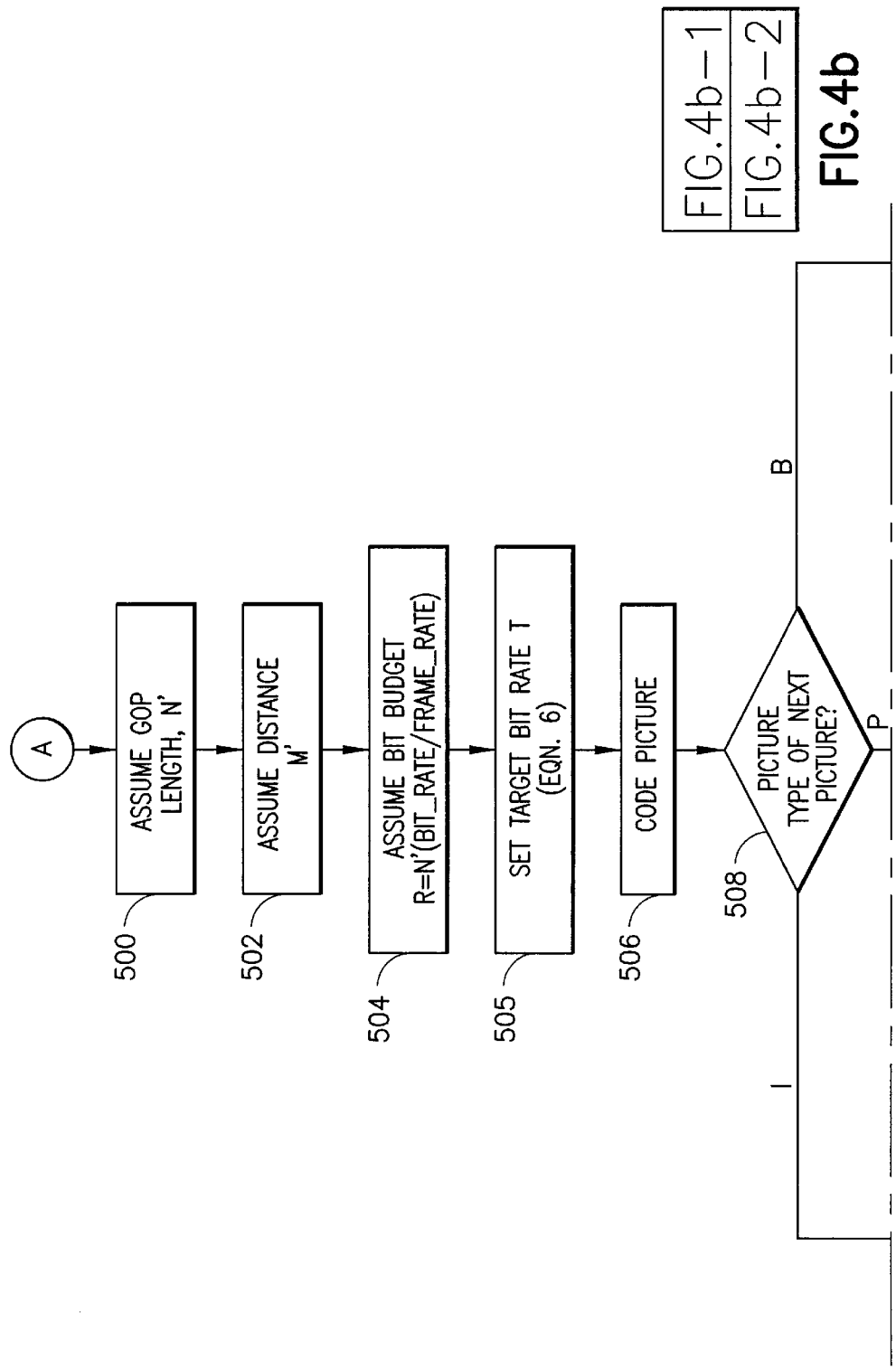

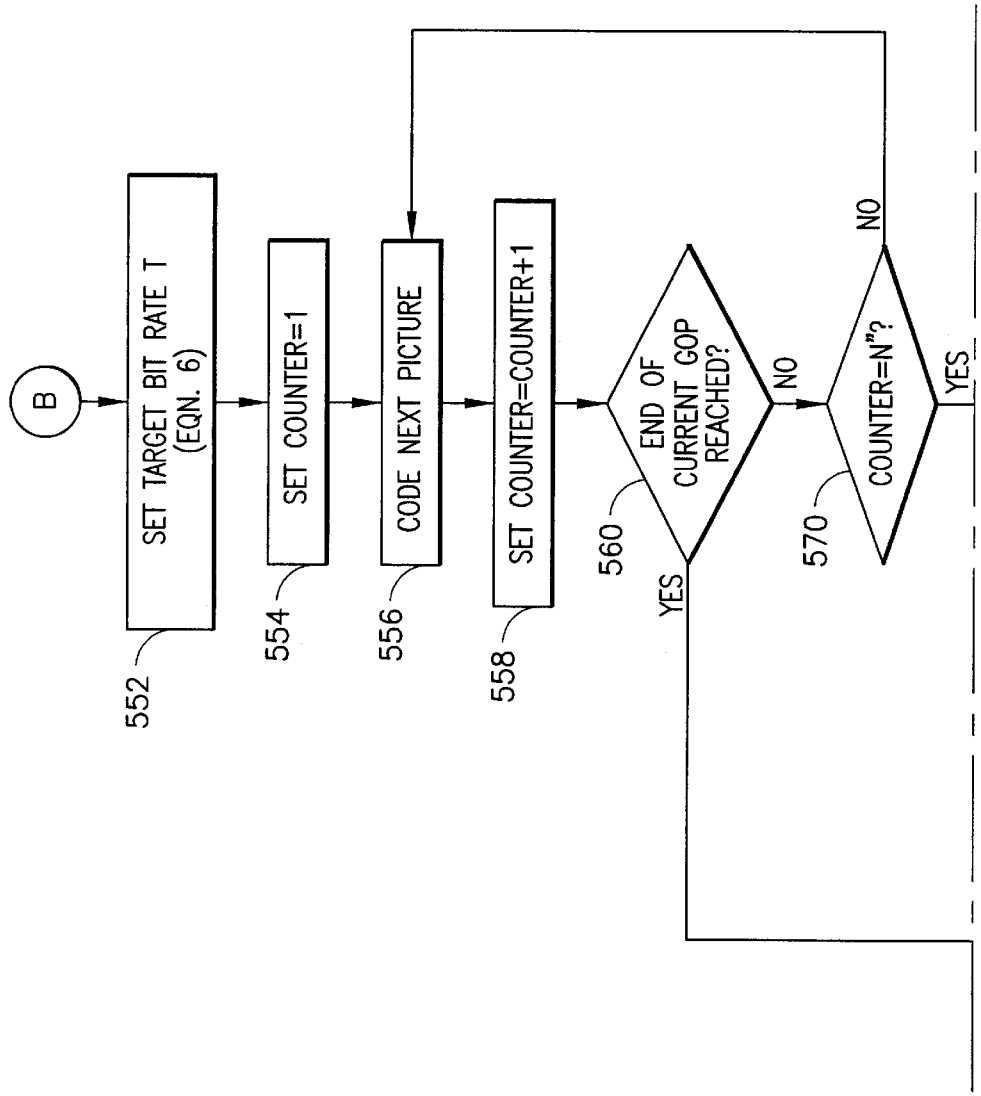

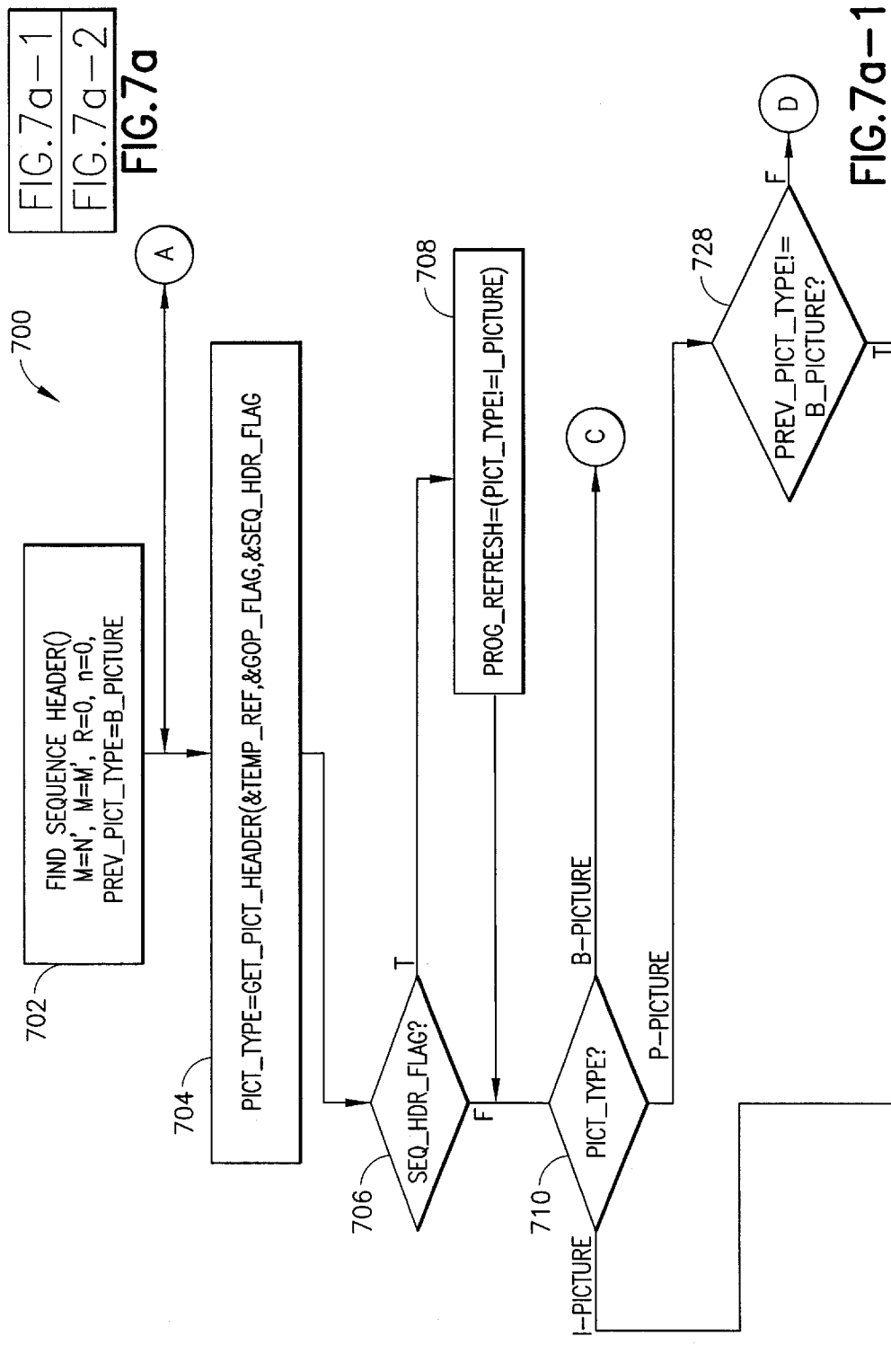

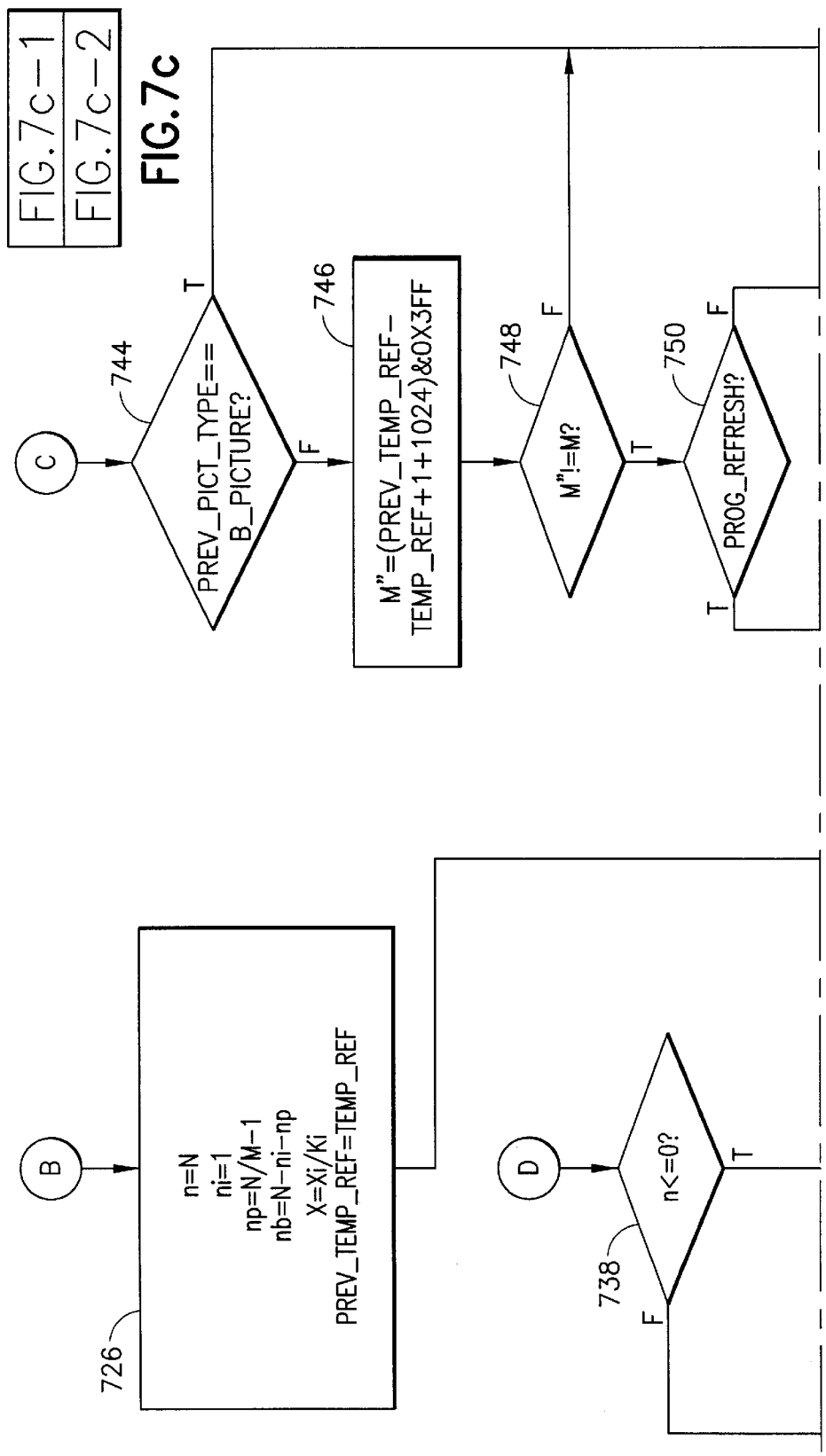

RATE CONTROL FOR AN MPEG TRANSCODER WITHOUT A PRIORI KNOWLEDGE OF PICTURE TYPE

BACKGROUND OF THE INVENTION

The present invention relates to a digital video transcoder and method for allocating bits for encoding successive pictures in a group of pictures (GOP) without a priori knowledge of the picture types in the GOP.

With digital video coding standards such as MPEG, input pictures can be coded in three different picture types, namely I, P and B. The three pictures require quite different numbers of bits for encoding because of the different nature of their temporal processing. Hence, an intelligent bit is allocation strategy should assign a number of bits for encoding according to the picture's type. This implies a requirement of a priori knowledge of the picture types for a given bit budget. This requirement is not a problem for a standalone encoder as the encoder can determine the picture type for each input picture.

In fact, the encoder can plan ahead for the types of the input pictures. In contrast, a transcoder has no such a priori knowledge regarding a picture's type before actually processing the picture. This creates difficulty in allocating an appropriate number of bits for encoding pictures in a transcoder.

Accordingly, it would be desirable to have a method and apparatus for allocating bits for encoding pictures in a transcoder without a priori knowledge of the picture type. The system should avoid a processing delay of about one GOP which would otherwise be incurred to extract the complete GOP structure information from a pre-compressed bit stream. In addition, the system should avoid the need to store the data corresponding to the GOP, thereby reducing the memory required for transcoding.

The system should be compatible with both variable bit rate and constant bit rate bitstreams.

The system should be compatible with statistical multiplexing and remultiplexing systems.

The present invention provides an apparatus and method having the above and other advantages.

SUMMARY OF THE INVENTION

The present invention relates to a digital video transcoder and method for allocating bits for encoding successive pictures in a group of pictures (GOP) without a priori knowledge of the arrangement of picture types in the GOP.

1. Progressive Refresh Sequence

A method for allocating bits for coding a progressive refresh sequence of pictures in a bitstream received at a digital video transcoder includes the steps of: (a) providing an assumed distance M' between a first picture of the bitstream and the next closest subsequent P-picture of the bitstream (in display order); (b) providing an assumed bit budget as a function of the assumed distance M'; (c) coding the first picture in accordance with the assumed bit budget; (d) determining a picture type of a second picture that immediately follows the first picture in the bitstream; (e) adjusting the assumed bit budget according to the picture type of the second picture; and (f) allocating bits for coding the second picture in accordance with the adjusted bit budget.

Thus, a bit budget for coding the pictures is initially assumed for the first picture, and the bit budget is updated as the second picture type is known. A target number of bits is allocated for coding each picture according to the bit budget. The first and second picture types generally indicate the picture distribution in the sequence.

The assumed bit budget is proportional to the assumed distance and a bit rate of the bitstream, and inversely proportional to a frame rate of the bitstream.

The pictures in the bitstream may form a progressive refresh sequence, where there is no GOP structure.

1.1 P-picture Followed by B-picture

When the first picture is a P-picture and the second picture is a B-picture, the method includes the further step of: determining an actual distance M" between the first picture and the next closest subsequent P-picture (in display order) according to the picture type of the first picture and the picture type of the second picture.

The actual distance M" is determined according to a difference between a temporal reference of the first picture, in a display order of the bitstream, and a temporal reference of the second picture, in the display order, plus one picture.

The method may include the further step of allocating bits for coding the remaining M"−1 pictures following the first picture in accordance with the adjusted bit budget.

The assumed bit budget is adjusted in the adjusting step (f) by +(M"−M')*"bit rate"/"frame rate", where "bit rate" is a bit rate of the bitstream, and "frame rate" is a frame rate of the bitstream.

1.2 P-picture Followed by P-picture

When the first and second pictures are P-pictures, the method includes the further step of: determining an actual distance M" between the first picture and the next closest subsequent P-picture (in display order) according to the picture type of the first picture and the picture type of the second picture. The actual distance M" is determined according to a difference between a temporal reference of the second picture and a temporal reference of the first picture. The temporal references are determined in relation to a display order of the bitstream.

The assumed bit budget is adjusted in the adjusting step (f) by −(M'−1)*"bit rate"/"frame rate", where "bit rate" is a bit rate of the bitstream, and "frame rate" is a frame rate of the bitstream.

The method includes the further step of allocating bits for coding a series of M" pictures following an initial M" pictures that includes the first and second pictures in the bitstream in accordance with the adjusted bit budget. Thus, the adjustments to the bit budget in one series of pictures is carried over to the next series to allow correct coding of the next series.

2. Non-progressive Refresh Sequence

Generally, the invention enables transcoding to begin by assuming a reasonable set of GOP parameters, including M, the distance between each I-picture and the next P-picture, and N, the GOP length. M and N are adjusted during transcoding as additional information becomes available regarding the GOP structure, e.g., the distribution of picture types in the GOP and the length of the GOP.

The assumed M can be corrected to the actual value within two frames, and the assumed N can be corrected to the actual value within one GOP. M should be verified, and adjusted if necessary, after each I- or P-picture, and N should be verified, and adjusted if necessary, after each I-picture. When M and/or N are adjusted, a bit rate R for coding the pictures, and $n_I$, $n_P$, and $n_B$, the remaining numbers of I, P and B-pictures in the current GOP, respectively, are also adjusted.

A method for allocating bits for coding a non-progressive refresh sequence of pictures in a bitstream received at a digital video transcoder, includes the steps of: (a) providing an assumed length N' of a particular group of pictures (GOP) of the bitstream; (b) providing an assumed bit budget as a function of the assumed length N'; providing an assumed distance M' between the first picture and the next closest subsequent P-picture of the bitstream (in display order); (c) allocating bits for coding a first picture of the particular GOP in accordance with the assumed bit budget, and N' and M'; (d) determining a picture type of a second picture that immediately follows the first picture; (e) adjusting the assumed bit budget according to the picture type of the second picture; and (f) allocating bits for coding the second picture in accordance with the adjusted bit budget.

The assumed bit budget is proportional to the assumed length N' and a bit rate of the bitstream, and inversely proportional to a frame rate of the bitstream.

M" may change within a GOP. Thus, the method may include the step of periodically verifying M" throughout the GOP. For example, M" may be calculated at every I-picture and/or P-picture that follows the first I-picture. The assumed bit budget is adjusted each time in accordance with M".

2.1 I-picture Followed by I-picture

When the first and second pictures are I-pictures, the method comprises the further step of: determining an actual distance M" between the first picture and the next closest subsequent I-picture of the bitstream according to the picture type of the second picture, and adjusting the assumed bit budget in accordance with M".

The actual distance M" is determined according to a difference between a temporal reference of the second picture, in a display order of the bitstream, and a temporal reference of the first picture, in the display order.

The adjusting step (e) comprises the step of: adjusting the assumed bit budget by $-(N'-1)*$"bit rate"/"frame rate", where "bit rate" is a bit rate of the bitstream, "frame rate" is a frame rate of the bitstream, and N=M=M".

The method comprises the further step of: allocating bits for coding the remaining pictures in the particular GOP following the second picture in accordance with the adjusted bit budget.

2.2 I-picture Followed by P-picture

When the first picture is an I-picture and the second picture is a P-picture, the method comprises the further steps of: determining an actual distance M" between the first picture and the next closest subsequent P-picture (in display order) according to the picture type of the second picture; and adjusting the assumed length N' of the GOP in accordance with the actual distance M" to provide an adjusted assumed length N"; wherein: the adjusting step (e) is responsive to the adjusted assumed length N'.

The assumed length N' of the particular GOP is adjusted in the adjusting step thereof by a factor, M(N'/M"), where M=M", to provide the adjusted assumed length N".

The adjusting step (e) comprises the step of: adjusting the assumed bit budget by a factor (N"−N')*"bit rate"/"frame rate", where "bit rate" is a bit rate of the bitstream, and "frame rate" is a frame rate of the bitstream.

The adjusting step (e) comprises the still further step of: adjusting the assumed bit budget by a factor, (M"−1')*"bit rate"/"frame rate", where "bit rate" is a bit rate of the bitstream, "frame rate" is a frame rate of the bitstream, and M=M".

Thus, both the GOP length and the distance M are used to adjust the bit budget, which in turn affects the target bit allocation for each picture.

The method includes the further step of allocating bits for coding the remaining pictures in the particular GOP following the second picture in accordance with the adjusted bit budget.

The method includes the further steps of determining if N">N or N"<N, where N is an actual length of the current GOP, after coding N" pictures in the current GOP. This is accomplished by observing the picture that is reached after coding N" pictures. For example, if the picture reached after coding N" pictures is a P-picture in the current GOP, then N"<N. If the picture reached after coding N" pictures is an I-picture, this signals the start of the next GOP, so N"=N. If an I-picture is coded before the N" are all coded, this indicates N">N. The already adjusted bit budget is then further adjusted based on whether N"<N or N">N, and bits are allocated for coding pictures in the bitstream following the N" coded pictures according to the further adjusted bit budget.

2.3 I-picture Followed by B-picture

When the first picture is an I-picture and the second picture is a B-picture, the method comprises the further steps of: determining an actual distance M" between the first picture and the next closest subsequent P-picture (in display order) according to the picture type of the second picture; and adjusting the assumed length N' of the GOP in accordance with the actual distance M" to provide an adjusted assumed length N"; wherein: the adjusting step (e) is responsive to the adjusted assumed length N'.

The assumed length N' of the particular GOP is adjusted in the adjusting step thereof by a factor, M(N'/M"), where M=M", to provide the adjusted assumed length N".

The adjusting step (e) comprises the step of: adjusting the assumed bit budget by a factor (N"−N')*"bit rate"/"frame rate", where "bit rate" is a bit rate of the bitstream, and "frame rate" is a frame rate of the bitstream.

The method comprises the further steps of: allocating bits for coding the remaining pictures in the particular GOP following the second picture in accordance with the adjusted bit budget.

Additionally, as discussed above, the already adjusted bit budget may be further adjusted based on whether N"<N or N">N, and bits may be allocated for coding pictures in the bitstream following the N" coded pictures according to the further adjusted bit budget.

Thus, the information learned regarding GOP length and M, the distance between I and/or P-pictures, in one GOP are used in coding the following GOPs. Target rates with incorrect starting GOP parameters will converge within a few GOPs.

Corresponding apparatus structures are also presented.

BRIEF DESCRIPTION OF THE DRAWINGS

FIG. 1(a) illustrates a progressive refresh sequence of pictures in display order for continuing GOPs.

FIG. 1(b) illustrates the sequence of pictures of FIG. 1(a) in encoding order.

FIG. 2(a) illustrates a progressive refresh sequence of pictures in display order for an initial GOP in a bitstream followed by continuing GOPs.

FIG. 2(b) illustrates the sequence of pictures of FIG. 2(a) in encoding order.

DETAILED DESCRIPTION OF THE INVENTION

Figure 3:
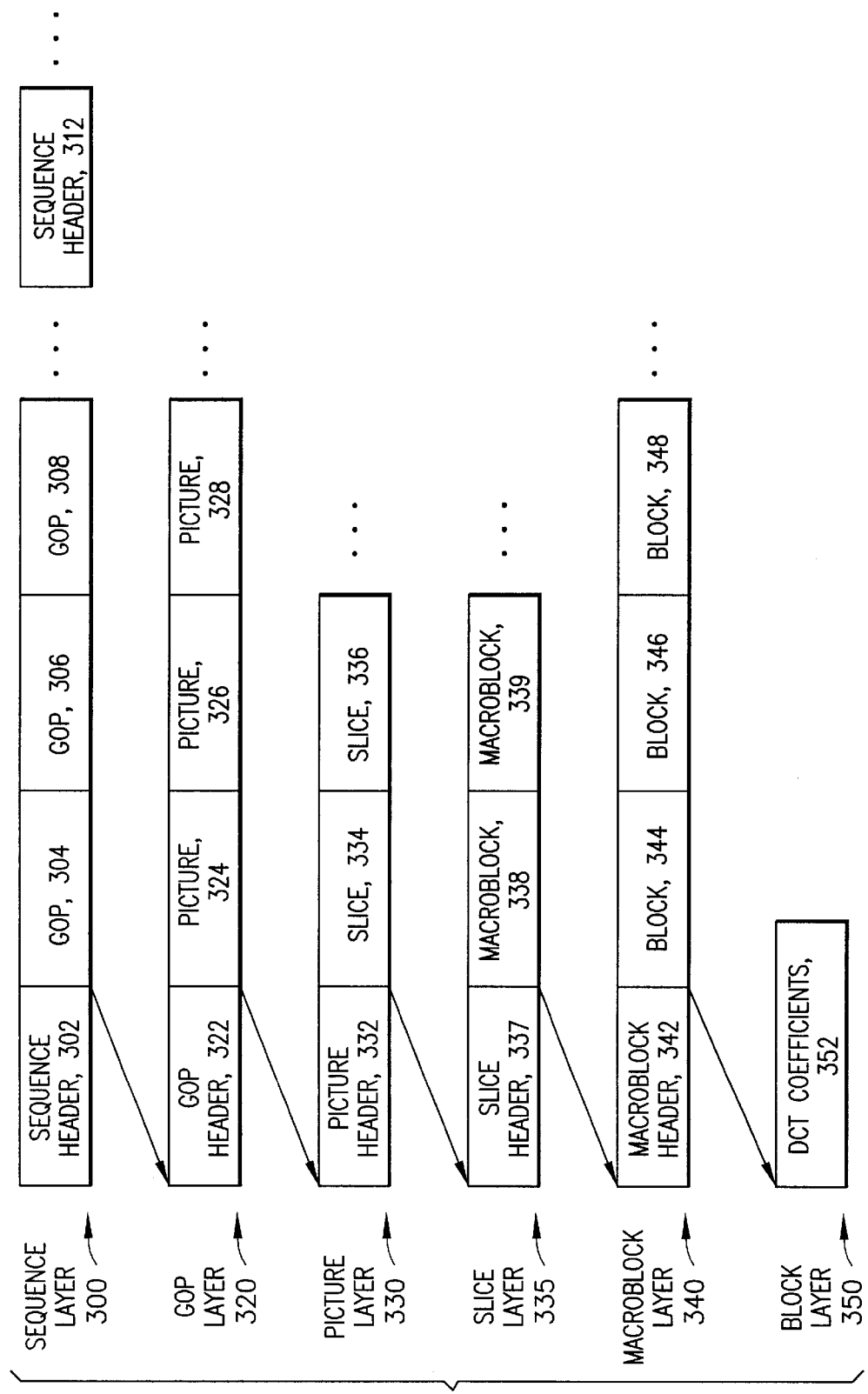
FIG. 3 illustrates an MPEG-2 bitstream structure.

The present invention relates to a digital video transcoder and method for allocating bits for encoding successive pictures in a group of pictures (GOP) without a priori knowledge of the picture types in the GOP.

A novel rate control scheme and apparatus is presented for a digital video transcoder, such as one conforming to the MPEG standard, that requires no a priori (e.g., beforehand) knowledge of the picture types. Studies indicate that the picture target rates determined by the proposed rate control system with and without a priori knowledge of the picture types are very close.

MPEG defines three picture types in terms of temporal processing. They are the intra-frame coded picture (I-picture), forward temporal predictive coded picture (P-picture), and the bi-directional temporal predictive coded picture (B-picture). In MPEG video coding, pictures of an input video sequence are often grouped into groups of pictures (GOPs), where each GOP may contain one I-picture, a number of P-pictures, and optionally one or more B-pictures between I or P-pictures. The structure of a GOP can often be described by two variables: (1) N—the number of pictures in a GOP, or the GOP length, and (2) M—the distance between I or P-pictures. An example of a GOP with N=15 and M=3, in display order, is:

$$B_{m-2}B_{m-1}I_{m}B_{m+1}B_{m+2}P_{m+3}B_{m+4}B_{m+5}P_{m+6} \ldots P_{m+N-3}B_{m+N-2}B_{m+N-1}I_{m+N}B_{m+N+1} \ldots$$

where the subscripts are the picture's temporal references, and the consecutive numbers denote consecutively displayed pictures.

In general, I-pictures require many more bits for encoding than P- and B-pictures because I-pictures do not take advantage of temporal correlations between successive pictures (e.g., frames). B-pictures use the least numbers of bits for encoding because they have two temporal references and can therefore be temporally predicted more efficiently than P-pictures. P-pictures use a number of bits for encoding that is generally between that used for B- and I-pictures.

Clearly, the bits assigned to each picture for encoding should be based on its type, or its need. Furthermore, a GOP can have all the three types of pictures, and the organization of the three picture types within a GOP can be very flexible. Therefore, to wisely allocate a bit budget for encoding the pictures within a GOP, it is necessary to have a priori knowledge of the types of pictures in the GOP, or the GOP structure. This requirement is not a problem for a standalone encoder (i.e., an encoder that is not part of a transcoder) since the encoder can decide the type for each picture, and plan ahead in allocating bits based on the type and arrangement of pictures in a GOP. In other words, the information on GOP structure is available to the encoder.

In contrast to the standalone encoder, a transcoder converts a pre-compressed bitstream into another bitstream at a new rate. The inputs to a transcoder are pre-compressed bitstreams. Before processing a picture, the transcoder has no a priori knowledge of the picture's type, and hence no a priori knowledge of the GOP structures of the pre-compressed bitstreams.

Moreover, some transcoding schemes re-use the motion vector (MV) fields of the received pre-compressed bitstream for encoding the output bitstream at the new data rate. In this case, the picture types of the pre-compressed pictures are maintained. This means that the transcoder has no control of the GOP structures of the new output bitstreams.

Furthermore, with conventional schemes, it is possible for the GOP structure information to be extracted from the pre-compressed bitstreams. For example, after scanning a pre-compressed bitstream by the first two I-pictures, a transcoder should be able to determine the GOP structure. However, this requires a processing delay of about one GOP and a requirement of extra memory to hold all the bits for the GOP.

The present invention discloses a novel rate control system for a digital video transcoder, such as that conforming to the MPEG standard, with no requirement of a priori knowledge of the GOP structures of the pre-compressed bitstreams. A rate control scheme is disclosed that causes no processing delay and requires no extra memory. The scheme starts with any reasonable set of GOP parameters, and then gradually corrects these GOP parameters, if necessary, as successive pre-compressed pictures are received at the transcoder. The scheme compensates for changing GOP parameters used by the encoder(s).

Furthermore, we analyze the differences in target bit rates determined by the proposed rate control scheme with and without a priori knowledge of the GOP structure of the pre-compressed bitstream. We show that the target rates with and without a priori knowledge of GOP structure tend to be the same within only one or two GOPs. We demonstrate the differences in target rates in both numerical examples and real video sequences.

Below, in section 1, we will first overview the rate control for MPEG video coding. In section 2, we present the novel rate control for MPEG transcoder. In section 3, we analyze the differences in target rates determined by the proposed rate control with and without a priori knowledge of GOP structure. In section 4, we present the simulation and comparison results. Conclusions are discussed in section 5.

1. Rate Control For MPEG Video Coding

In MPEG video coding, pictures of all the three types (I, P or B) undergo the block Discrete Cosine Transform (DCT). The DCT coefficients are then quantized and variable length encoded. The resulting number of bits for each picture depends on the complexity of its corresponding block DCT image. I-pictures are coded without reference to any other pictures and, therefore, their DCT images usually require the most number of bits. P-pictures are first forward temporally predicted, and their temporal prediction difference images are then coded. The temporal prediction difference images usually contain much less information than the original pictures, and therefore need less bits for coding. B-pictures with two temporal references can often be better temporally predicted than P-pictures. Hence, B-pictures require the least number of bits. An intelligent bit allocation strategy should assign the bits to a picture based on the picture's type, or the picture's complexity.

Let $X_n$ be the complexity measure for picture n in a GOP of N pictures. In MPEG Test Model 5 (TM5), the complexity measure for a picture is defined as the product of the average quantization parameter used for the picture and the resulting number of bits. Logically, the bits allocated for a picture should be proportional to the picture's complexity measure, $X_n$, i.e., $$T_n = CX_n \quad n=0,1,\ldots,N-1 \tag{1}$$

where C is a constant. Here, we have assumed a linear model between the picture complexity measure and the number of bits required for coding. Furthermore, without any bias, a GOP of N pictures should be allocated $$R_{GOP,N} = N \cdot \frac{\text{bits\_rate}}{\text{frame\_rate}} \text{ bits.} \tag{2}$$

Clearly, the total number of bits assigned to all the pictures within a GOP of N pictures should be equal to $R_{GOP,N}$, i.e., $$R_{GOP,N} = \sum_{n=0}^{N-1} T_n = \sum_{n=0}^{N-1} CX_n = C\sum_{n=0}^{N-1} X_n \tag{3}$$

From equations (1) and (3), we have $$T_n = \frac{X_n}{\sum_{n=0}^{N-1} X_n} R_{GOP,N} \tag{4}$$

Assume that all the pictures of the same type, i.e., I, P or B, have the same complexity measure, which is a reasonable assumption, at least for continuous scenes. We only need three complexity measures, one for each picture type. That is, $X_I$ for I-pictures, $X_P$ for P-pictures, and $X_B$ for B-pictures. The target rate for frame n of type $t \in \{I,P,B\}$ and complexity measure $X_{n,t\in\{I,P,B\}}$ can therefore be written as:

$$T_n = \frac{X_{n,t}}{N_I X_I + N_P X_P + N_B X_B} R_{GOP,N} \tag{5}$$

where $N_I$, $N_P$ and $N_B$ are the numbers of I, P and B-pictures, respectively, in the GOP. By eqn. (5), the pictures of the same type are assigned the same number of bits. This bit allocation strategy can be further modified by considering only the distribution of the remaining number of bits over the remaining pictures in the current GOP, i.e., $$T_n = \frac{X_{n,t}}{n_I X_I + n_P X_P + n_B X_B} R \tag{6}$$

where $n_I$, $n_P$ and $n_B$ are, respectively, the remaining numbers of I, P and B-pictures in the current GOP, and R is the remaining number of bits, defined as $$R \Leftarrow R - \sum_{n'=0}^{n-1} T_{n'} \tag{7}$$

where ← denotes the assignment statement.

The remaining number of bits, R, needs to be updated at the beginning of each GOP as, $$R = R + R_{GOP,N} = R + N \cdot \frac{\text{bit\_rate}}{\text{frame\_rate}} \tag{8}$$

We now show that eqn. (6) also assigns the same number of bits to the pictures of the same type as long as the encoder can meet the target rate at each picture. For example, assume that frame n is a B-picture. Frame n can actually be either an I, P or B-picture. The encoder meets the nominal rate, $T_n$, for frame n. The target rate for frame n+1, $T_{n+1}$, is therefore:

$$T_{n+1} = \frac{X_{n+1,t}}{n_I X_I + n_P X_P + (n_B - 1) X_B} (R - T_n) \tag{9a}$$

$$= \frac{X_{n+1,t}}{n_I X_I + n_P X_P + (n_B - 1) X_B} \tag{9b}$$

$$\left(R - \frac{X_B}{n_I X_I + n_P X_P + n_B X_B} R\right)$$

$$= \frac{X_{n+1,t}}{n_I X_I + n_P X_P + (n_B - 1) X_B} \tag{9c}$$

$$\left(\frac{n_I X_I + n_P X_P + n_B X_B - X_B}{n_I X_I + n_P X_P + n_B X_B}\right) R$$

$$= \frac{X_{n+1,t}}{n_I X_I + n_P X_P + n_B X_B} R \tag{9d}$$

As seen, the target rate for frame n+1, $T_{n+1}$, depends upon only the type of frame n+1, i.e., $X_{n+1,t}$. In other words, regardless of the type (either I, P or B) of frame n, frame n+1 will be assigned the same number of bits according to its own type. This implies that equations (5) and (6) are actually the same if the pictures of the same type have the same complexity measure, and the encoder can meet the target rate at each picture. Equation (6) is, however, more practical as it addresses the changes in picture complexity measures and the difference between the target and actual rates at each picture.

In practice, the quality requirement may not be the same for the different picture types. For example, B-pictures are never used as references in the future temporal prediction. Hence, they can tolerate more distortion than I- and P-pictures. To address this concern of different quality requirements, we can further introduce a weighting factor for each picture type, $K_{n,t}$, as $$T_n = CX_{n,t}/K_{n,t} \tag{10}$$

where $$K_t = \begin{cases} K_I & \text{for } I \text{ picture} \\ K_P & \text{for } P \text{ picture} \\ K_B & \text{for } B \text{ picture} \end{cases} \tag{11}$$

The bit allocation strategies (e.g., equations 5 and 6) now become:

$$T_n = \frac{X_{n,t}/K_{n,t}}{N_I X_I/K_I + N_P X_P/K_P + N_B X_B/K_B} R_{GOP,N} \tag{5b}$$

and $$T_n = \frac{X_{n,t}/K_{n,t}}{n_I X_I/K_I + n_P X_P/K_P + n_B X_B/K_B} R \tag{6b}$$

Equation (6b) is the same one used in MPEG TM5 when $K_I = K_P = 1$ and $K_B = 1.4$.

The bit allocation strategy (e.g., equations 5 and 6) requires a priori knowledge of GOP structure, i.e., the numbers of I-, P- and B-pictures in a GOP, $N_I, N_P$, and $N_B$, or the remaining number of I, P and B-picture in the current GOP, $n_I, n_P$ and $n_B$. Given a pair of GOP structure variables, N and M, we can have $N_I=1$, $N_P=N/M-N_I$ and $N_B=N-N_P-N_I$. From $N_I, N_P$, and $N_B$, we can also calculate $n_I, n_P$ and $n_B$ during encoding. For example, if a P-picture is just encoded, the remaining number of P-pictures in the current GOP is decreased by 1, i.e., $n_P = n_P - 1$.

As discussed, this information is unfortunately not available for a transcoder. Without a complete knowledge of the GOP structure of pre-compressed bitstreams, it is difficult to perform an intelligent bit allocation strategy. A transcoder can learn the GOP structure of a pre-compressed bitstream by scanning the bitstream through the first two I-pictures. This, however, may cause a processing delay by one GOP and require extra memory for holding the bits of the GOP.

2. Rate Control for a Transcoder

We now describe a novel rate control system for a transcoder with no requirement of a priori knowledge of GOP structure of the pre-compressed bitstreams. The proposed rate control system causes no processing delay and requires no extra memory. It can start with any reasonable set of GOP parameters, and then gradually corrects these GOP parameters as encoding progresses, if necessary.

Table 1(a) shows all the possible picture organizations where the subscripts are the pictures' temporal references, in display order. Each picture refers to a frame or field, or portion thereof. For example, the present invention is compatible with coding of video object planes (VOPs) as known from the MPEG-4 standard. The present invention is compatible with both progressive scan and interlaced scan video.

For the sequence GOP(N=M=1), there are only I-pictures. For the sequence GOP(N,M=1), there are only I- and P-pictures. For the sequence GOP(N=M), there are only I- and B-pictures. For the sequence GOP(N,M), there are I-, P- and B-pictures. For the sequence GOP(M=1), there are only P-pictures. For the sequence GOP(M), there are only P- and B-pictures.

The first four cases in Table 1(a) are non-progressive refresh sequences since they have I-pictures. The last two case (e.g., GOP(M=1) and GOP(M)) have no I-pictures, but use a progressive refresh where P-pictures contain I-slices. An I-slice is an intra-coded portion of a picture typically extending horizontally across the picture. The location of the I-slice changes in successive P-pictures to refresh a different portion of the successive P-pictures. Hence, with a progressive refresh, the GOP length N is no longer necessary in describing the picture organization. Nevertheless, M can still be used to indicate the distance between two consecutive P-pictures. The "distance" is measured in terms of number of pictures herein, although any corresponding measure, such as time, can be used. In terms of bit allocation, we can set N=M, $N_I=0$ (as there is no I pictures for progressive refresh sequence), $N_P=N/M-N_I=1$, $N_B=N-N_P-N_I=N-N_P$ in N=M bit allocation equation (5) for progressive refresh.

Table 1(b) shows the corresponding forms of picture organizations in encoding order (e.g., in bitstream order) for the picture sequences of Table 1(a). If M=1 (there is no B-picture in the sequence), the encoding order is actually the same as the display order. On the other hand, if M≠1 (e.g., there are M−1 B-pictures between successive I- or P-pictures), the future I- or P-pictures have to be encoded before the M−1 B-pictures.

Furthermore, for the first GOP (e.g., initial or non-continuous GOP, designated $GOP_0$) in a video sequence with M≠1, there may not be any B-pictures before the first I or P-picture, as shown in Table 2(a). Table 2(a) shows possible picture organizations of the first (initial) GOP after a sequence header in a video stream, in display order. The initial GOPs are designated $GOP_0$. For example, for $GOP_0$ (M), the first picture is designated $P_0$. An initial GOP may be processed by a transcoder when a bitstream is initially acquired or re-acquired, for example.

Table 2(b) shows the first GOP of Table 2(a) in encoding order. Here, an initial GOP with M≠1 is shown, where the second I- or P-picture is encoded before any B-picture. The second picture in encoding order will be either an I or P-picture, as shown in Table 2(b).

TABLE 1(a)

| GOP(N = M = 1): | — | $I_{m-1}$ | $I_m$ | $I_{m+1}$ | $I_{m+2}$ | — | | | | | | |
| GOP(N, M = 1): | — | $P_{m-1}$ | $I_m$ | $P_{m+1}$ | $P_{m+2}$ | — | $P_{m+N-1}$ | $I_{m+N}$ | $P_{m+N+1}$ | — | | |
| GOP(N = M): | — | $B_{m-1}$ | $I_m$ | $B_{m+1}$ | $B_{m+2}$ | — | $B_{m+M-1}$ | $I_{m+M}$ | $B_{m+M+1}$ | — | | |
| GOP(N, M): | — | $B_{m-1}$ | $I_m$ | $B_{m+1}$ | $B_{m+2}$ | — | $B_{m+M-1}$ | $P_{m+M}$ | $B_{m+M+1}$ | — | $P_{m+2M}$ | — | $I_{m+N}$ | — |
| GOP(M = 1): | — | $P_{m-1}$ | $P_m$ | $P_{m+1}$ | $P_{m+2}$ | — | | | | | | |
| GOP(M): | — | $B_{m-1}$ | $P_m$ | $B_{m+1}$ | $B_{m+2}$ | — | $B_{m+M-1}$ | $P_{m+M}$ | $B_{m+M+1}$ | — | $P_{m+2M}$ | — |

TABLE 1(b)

| GOP(N = M = 1): | $I_m$ | $I_{m+1}$ | $I_{m+2}$ | — | | | | | | |
| GOP(N, M = 1): | $I_m$ | $P_{m+1}$ | $P_{m+2}$ | — | $P_{m+N-1}$ | $I_{m+N}$ | $P_{m+N+1}$ | — | | |
| GOP(N = M): | $I_m$ | $B_{m-(M-1)}$ | $B_{m-(M-1)+1}$ | — | $B_{m-1}$ | $I_{m+M}$ | $B_{m+1}$ | — | | |
| GOP(N, M): | $I_m$ | $B_{m-(M-1)}$ | $B_{m-(M-1)+1}$ | — | $B_{m-1}$ | $P_{m+M}$ | $B_{m+1}$ | — | $B_{m+M-1}$ | $P_{m+2M}$ | — | $I_{m+N}$ | — |
| GOP(M = 1): | $P_m$ | $P_{m+1}$ | $P_{m+2}$ | — | | | | | | |
| GOP(M): | $P_m$ | $B_{m-(M-1)}$ | $B_{m-(M-1)+1}$ | — | $B_{m-1}$ | $P_{m+M}$ | $B_{m+1}$ | — | $B_{m+M-1}$ | $P_{m+2M}$ | — |

TABLE 2(a)

| $GOP_0(N = M)$: | $I_0$ | $B_1$ | $B_2$ | — | $B_{M-1}$ | $I_M$ | $B_{M+1}$ | — | $I_{2M}$ | — | | | |
| $GOP_0(N, M)$: | $I_0$ | $B_1$ | $B_2$ | — | $B_{M-1}$ | $P_M$ | $B_{M+1}$ | — | $B_{2M-1}$ | $P_{2M}$ | — | $P_{3M}$ | — | $I_N$ | — |
| $GOP_0(M)$: | $P_0$ | $B_1$ | $B_2$ | — | $B_{M-1}$ | $P_M$ | $B_{M+1}$ | — | $P_{2M}$ | — | | | |

TABLE 2(b)

| $GOP_0(N = M)$: | $I_0$ | $I_M$ | $B_1$ | $B_2$ | — | $B_{M-1}$ | $I_{2M}$ | $B_{M+1}$ | — | | | |
| $GOP_0(N, M)$: | $I_0$ | $P_M$ | $B_1$ | $B_2$ | — | $B_{M-1}$ | $P_{2M}$ | $B_{M+1}$ | — | $B_{2M-1}$ | $P_{3M}$ | — | $I_N$ | — |
| $GOP_0(M)$: | $P_0$ | $P_M$ | $B_1$ | $B_2$ | — | $B_{M-1}$ | $P_{2M}$ | $B_{M+1}$ | — | | | |

FIG. 1(a) illustrates a progressive refresh sequence of pictures in display order for continuing GOPs. Specifically, the progressive refresh sequence GOP(M) from Table 1(a) is illustrated for a distance between P-pictures of M=3, and for a continuing (e.g., non-initial, or open) GOP. Additionally, the GOP length is N=M=3 pictures.

In the video sequence 100, a first GOP 110 includes pictures $P_7$, $B_8$ and $B_9$, while a second GOP 120 includes pictures $P_{10}$, $B_{11}$ and $B_{12}$, and a third GOP 130 includes pictures $P_{13}$, $B_{14}$, and $B_{15}$. The subscript "7" for $P_7$ is chosen simply as an example. A subsequent GOP includes $P_{16}$ as its first picture.

Figures 1, 2, 4A:
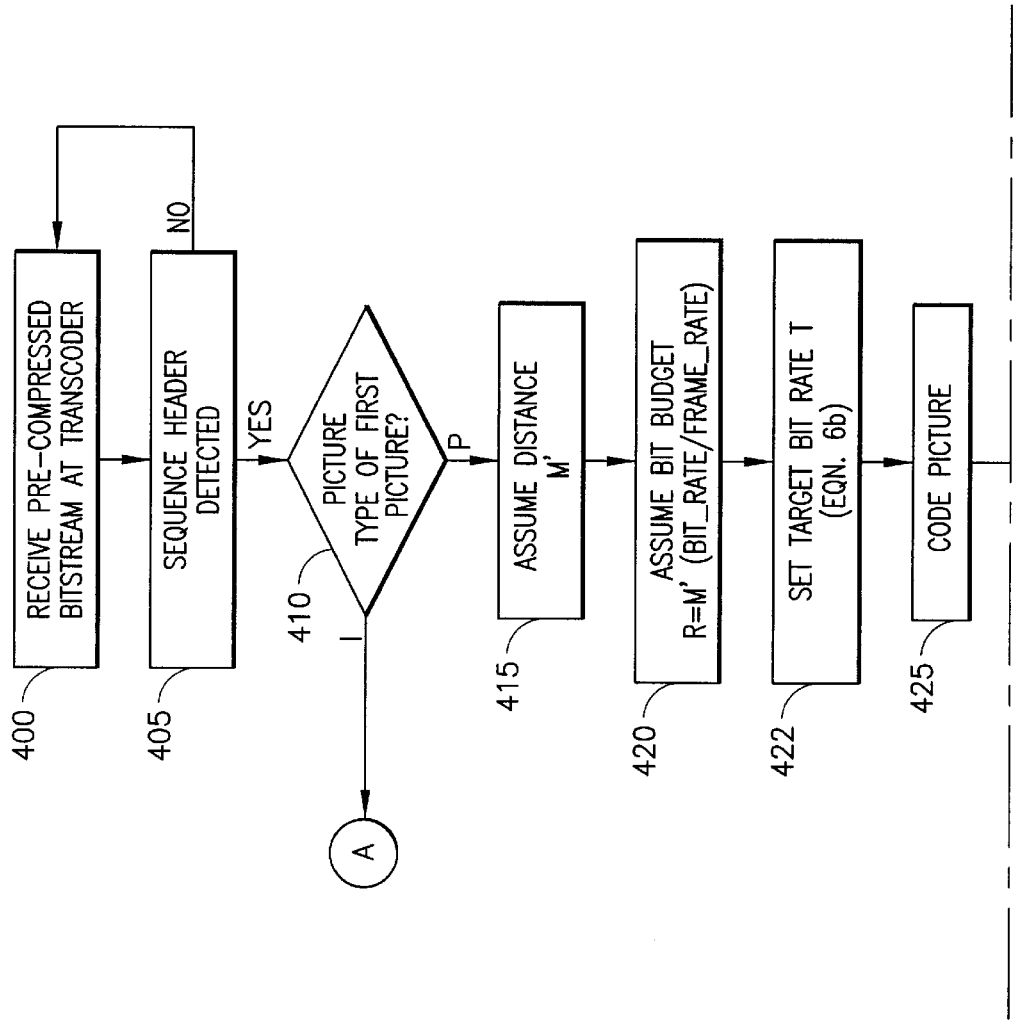
FIG. 4(a) illustrates a coding method for a progressive refresh picture sequence in accordance with the present invention.
Figures 2, 4A:
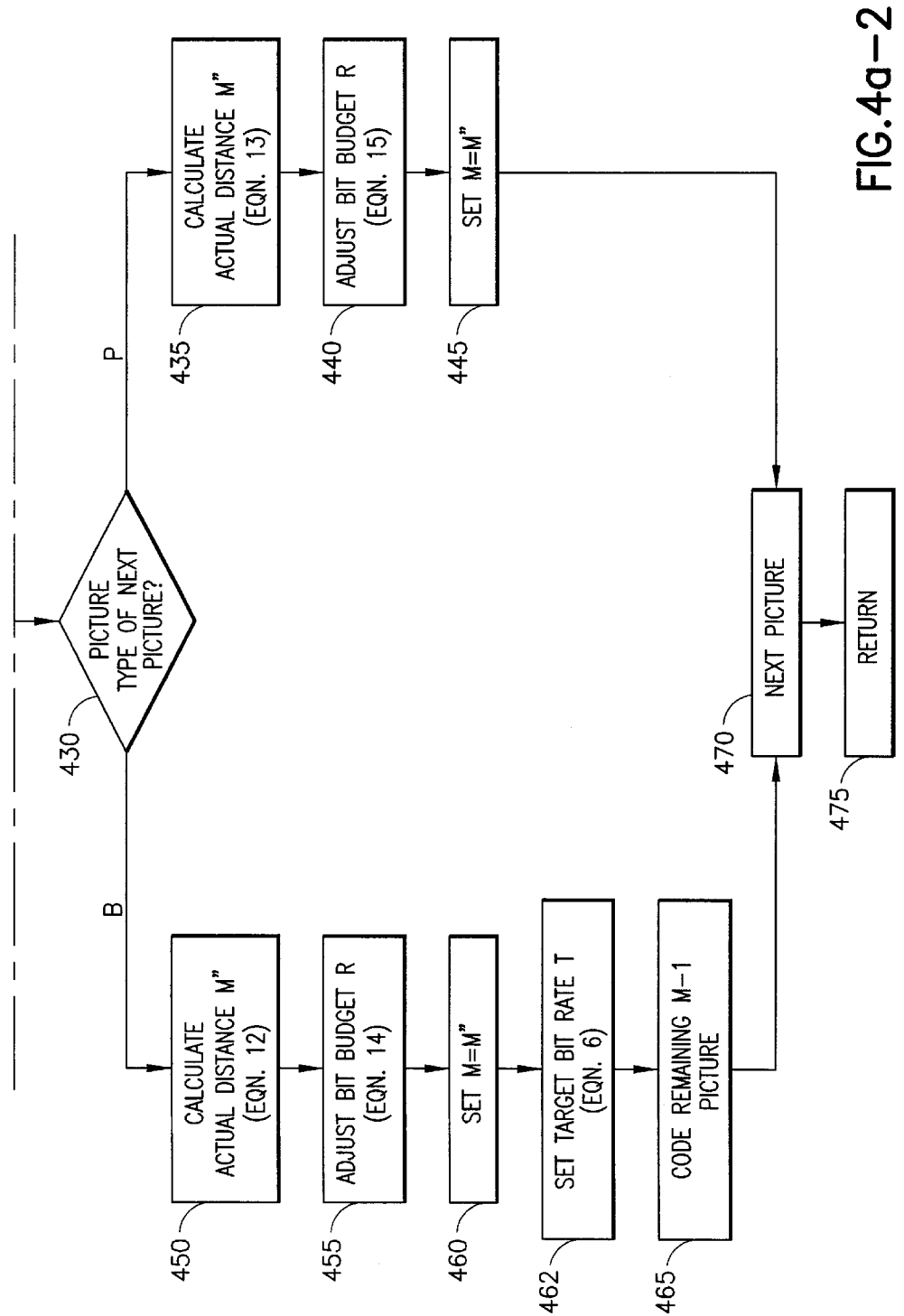

FIG. 1(*b*) illustrates the sequence of pictures of FIG. 1(*a*) in encoding order. The encoded video sequence 150 corresponds to the sequence GOP(M) from Table 1(b). Since $B_8$ and $B_9$ are temporally backward predicted from $P_{10}$, $B_8$ and $B_9$ follow $P_{10}$ in the encoded sequence 150. Similarly, $B_{11}$ and $B_{12}$ follow $P_{13}$, and $B_{14}$ and $B_{15}$ follow $P_{16}$.

FIG. 2(*a*) illustrates a progressive refresh sequence of pictures in display order for an initial GOP in a bitstream followed by continuing GOPs. Specifically, the progressive refresh sequence $GOP_0(M)$ from Table 2(a) is illustrated for a distance between P-pictures of M=3, and a GOP length is N=M=3 pictures.

In the video sequence 200, a first, initial GOP 210 includes pictures $P_0$, $B_1$ and $B_2$, while a second, continuing GOP 220 includes pictures $P_3$, $B_4$ and $B_5$, and a third, continuing GOP 230 includes pictures $P_6$, $B_7$, and $B_8$. A subsequent GOP includes $P_9$ as its first picture.

FIG. 2(*b*) illustrates the sequence of pictures of FIG. 2(*a*) in encoding order. The encoded video sequence 250 corresponds to the sequence $GOP_0(M)$ from Table 2(b). Since $B_1$ and $B_2$ are temporally backward predicted from $P_3$, $B_1$ and $B_2$ follow $P_3$ in the encoded sequence 250. Essentially, the B-pictures that would use $P_0$ for backward temporal prediction are not present, so $P_3$, $B_1$ and $B_2$ follow $P_0$. Similarly, $B_4$ and $B_5$ follow $P_6$, and $B_7$ and $B_8$ follow $P_9$.

FIG. 3 illustrates an MPEG-2 bitstream structure. A sequence layer 300 includes a sequence header 302, followed by a number of GOPs, e.g., GOPs 304, 306 and 308, followed by additional sequence headers and GOPs, including sequence header 312. A GOP layer 320 includes a GOP header 322, followed by data from a number of pictures, e.g., pictures 324, 326 and 328. A picture layer 330 includes a picture header 332, followed by a number of slices, e.g., slices 334 and 336. A slice layer 335 includes a slice header 337, followed by a number of macroblocks, e.g., macroblocks 338 and 339. A macroblock layer 340 includes a macroblock header 342, followed by a number of blocks, e.g., blocks 344, 346 and 348. A block layer includes DCT coefficients 352.

For a given pre-compressed bitstream, the transcoder can start processing anywhere in the bitstream. Initially, the transcoder will skip all the bits until reaching the sequence header 300, which contains information about picture size, frame rate, and the like. Optionally, the GOP header 322 may follow the sequence header 302 (for non-progressive refresh only). If a GOP header does follow the sequence header 302, the bitstream is definitely a non-progressive refresh sequence. Otherwise, the bitstream may, or may not, be of progressive refresh. The picture layer 330 then follows.

The picture immediately following the sequence header (i.e., the first picture in the GOP, i.e., picture 324) can be either an I or P-picture. If it is an I-picture, the bitstream is a non-progressive refresh sequence. Otherwise, the bitstream is a progressive refresh sequence. The bit allocation procedures of the present invention for bitstreams with progressive refresh and non-progressive refresh are slightly different. In the following two subsections, we detail both.

The following notation will be used:

N,M—the actual values (i.e., reflecting the true GOP structure) of the GOP parameters, N and M;

N',M'—the initial assumed values of the GOP parameters, N and M;

N",M"—the (current) updated values of the GOP parameters, N and M;

$N_I, N_P, N_B$—the numbers of I, P and B pictures, respectively, in a GOP;

$n_I, n_P, n_B$—the number of I, P and B pictures, respectively, remaining in the current GOP;

R—the number of remaining bits for the current GOP;

bit_rate—the effective output bit rate in bits per second that may be variable (we assume that bit_rate is available to transcoder);

frame_rate—the effective frame_rate in frames per second, which may not be the same as the frame_rate embedded in the sequence header due to the presence of the repeat_first_field (we assume that frame rate is available to transcoder);

div—Integer division with truncation of the result toward zero; and

←—Assignment statement (from the right to the left).

(i) Progressive Refresh

For a progressive refresh sequence, there will be no GOP header, and the first picture immediately following the sequence header (in encoding order) has to be a P-picture. See sequences GOP(M=1) and GOP(M) in Table 1(b) and $GOP_0(M)$ in Table 2(b). Instead of waiting to correctly determine M, we proceed to process the first P-picture with any reasonable assumed M, say M', and a bit budget of $R=R_{GOP,M}=M'\cdot(bit\_rate/frame\_rate)$ bits in calculating the target bit rate (see eqn. 6). Note that with M', we have $N_P=1$ and $N_B=M'-N_P$. For example, refer to FIG. 1(*a*) or 2(*a*), where the distance between P-pictures is M'=3, the number of P-pictures in a GOP is one, and the number of B-pictures in a GOP is two.

The second picture in the GOP, in encoding order, can be either a B-picture (GOP(M)) or a P-picture (GOP(M=1) or $GOP_0(M)$), as shown in Tables 1(b) and 2(b), respectively.

In either case, we can calculate the actual value of M from the temporal references of the first two pictures of a GOP in encoding order. Specifically, let temp_ref_picture1 and temp_ref_picture2 be the temporal references for the first and second pictures, respectively. The temporal reference may be embedded in the picture header. If the second picture is a B-picture, e.g., sequence (GOP(M)) in Table 1(b), the correct value of M, say M", is:

$$M"=\text{temp\_ref\_picture1}-\text{temp\_ref\_picture2}+1. \quad (12)$$

For example, in FIG. 1(*b*), consider $P_{10}$ and $B_8$ as first and second pictures, respectively, in an encoded video sequence. Then, temp_ref_picture1 is the temporal reference of $P_{10}$ (e.g., "10"), temp_ref_picture2 is the temporal reference of $B_8$ (e.g., "8"), and M"=10−8+1=3. Note that the temporal references refer to the display order of the pictures.

Otherwise, if the second picture is a P-picture, e.g., sequence (GOP(M=1) in Table 1(b), or sequence $GOP_0(M)$) in Table 2(b), the correct value of the distance between P-pictures is:

$$M"=\text{temp\_re\_picture2}-\text{temp\_ref\_picture1}. \quad (13)$$

For example, in FIG. 2(*b*), consider $P_0$ and $P_3$ as first and second pictures, respectively, in an encoded video sequence.

Then, temp_ref_picture1 is the temporal reference of $P_0$ (e.g., "0"), temp_ref_picture2 is the temporal reference of $P_3$ (e.g., "3"), and M"=3–0=3.

With a correct value of M, say M", the remaining number of bits, R (see eqn. 7), is adjusted accordingly. Specifically, if the second picture is a B-picture, as with sequence (GOP(M)) in Table 1(b), R is updated as $$R = R + (M'' - M') \cdot \frac{\text{bit\_rate}}{\text{frame\_rate}}. \quad (14)$$

As seen, for M">M' (actual distance between P-pictures is greater than assumed distance), the first P-picture has been assigned relatively more bits and, therefore, the remaining pictures will be assigned relatively fewer bits. For M"<M' (actual distance between P-pictures is less than assumed distance), the first P-picture has been assigned relatively fewer bits and the remaining pictures will be assigned relatively more bits.

On the other hand, if the second picture is a P-picture, e.g., as with sequences (GOP(M=1) in Table 1(b), or sequence $\text{GOP}_0(M)$) in Table 2(b), there are no B-pictures between the first two P-pictures in the encoded video sequence. Hence, the bits allocated for the assumed M'–1 B-pictures between two P pictures (in encoding order) should be subtracted from R, as $$R = R - (M' - 1) \cdot \frac{\text{bit\_rate}}{\text{frame\_rate}}. \quad (15)$$

We then set M=M". If the transcoder can meet the target rate at each picture, at the end of the first M pictures, we will have R=0. Hence, we will have a bit budget of $R=R_{GOP,M}=M \cdot$ (bit_rate/frame_rate) bits for next M pictures. To address any subsequent change in M, we check the value of M after each P-picture.

FIG. 4(a) illustrates a coding method for a progressive refresh picture sequence in accordance with the present invention. The aforementioned bit allocation technique for progressive refresh sequences is summarized as follows.

At block 400, the pre-compressed digital video bitstream is received at a transcoder. The coded pictures are in an encoding order. At block 405, the bitstream is processed to detect a sequence header. At block 410, the picture type of the first picture following the sequence header is determined.

Figures 2, 4B:
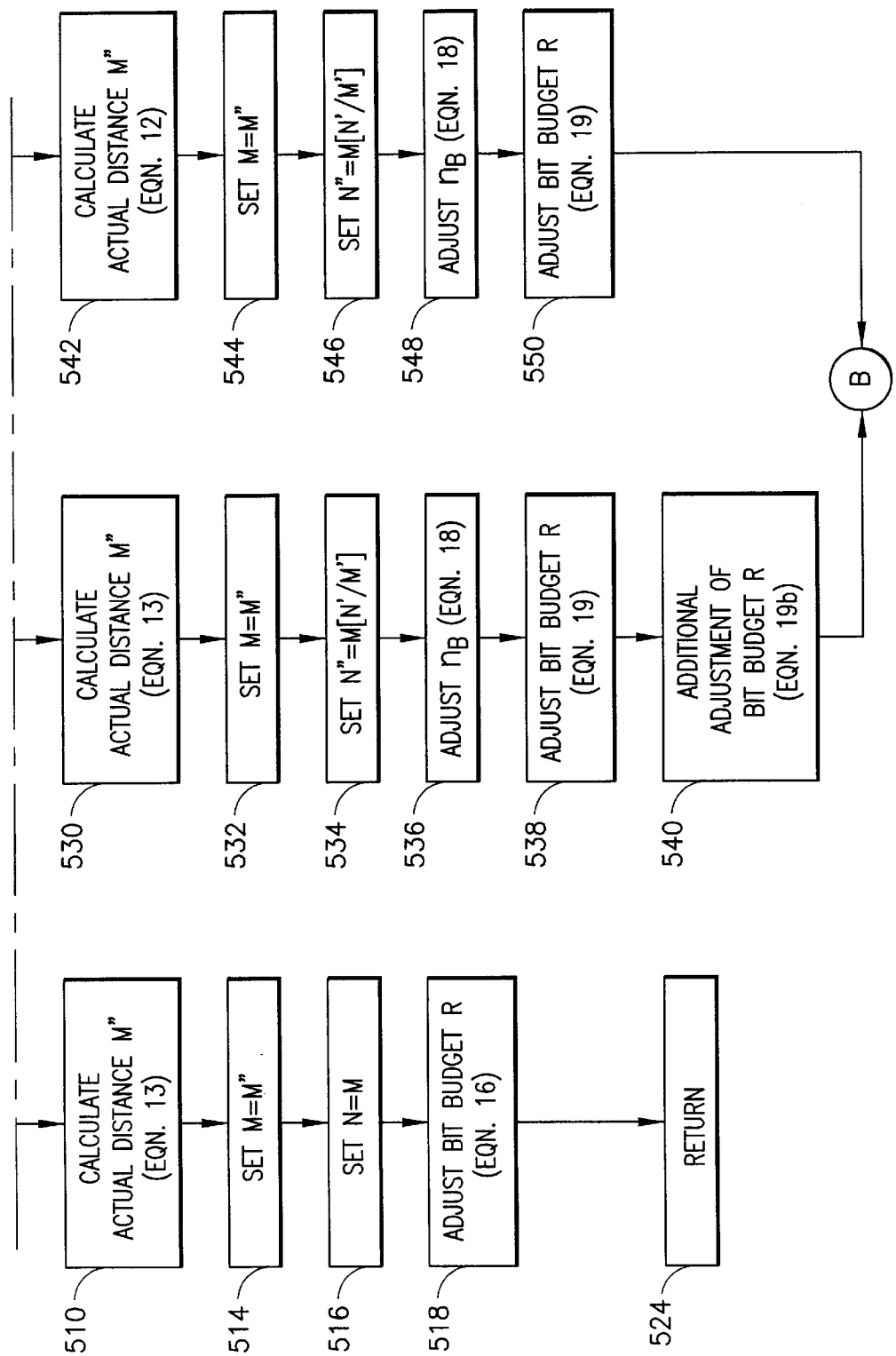
FIG. 4(b) illustrates a coding method for a non-progressive refresh picture sequence in accordance with the present invention.

If it is an I-picture, processing continues at block "A" in FIG. 4(b).

If the first picture following the sequence header is a P-picture, processing continues at block 415, where an assumed distance M' is set. M' is defined herein as a distance between the first picture following the sequence header, and the next P-picture in the display order. At block 420, an assumed bit budget R is determined based on M', the bit rate and the frame rate of the bitstream. At block 422, a target bit rate T is set in accordance with eqn. 6b. At block 425, the first picture is coded according to T. At block 430, if the next picture (e.g., the second picture) is a P-picture, the actual distance M" is determined at block 435 according to eqn. 13. At block 440, the bit budget R is adjusted using eqn. 15. At block 445, M is set to M".

At block 430, if the next picture in the sequence, e.g., the second picture, is a B-picture, the actual distance M" is determined at block 450 according to eqn. 12. At block 455, the bit budget R is adjusted using eqn. 14. At block 460, M is set to M". At block 462, the target bit rate T is set (e.g., using eqn. 6). Next, the remaining M–1 pictures (including the second picture) are coded according to T at block 465.

At block 470, the next picture is processed. This may be the first picture of the next series of M' pictures, for example. At block 475, processing returns, e.g., to block 415. However, note that, instead of blindly assuming the length and bit budgets at blocks 415 and 420, respectively, the values determined in the previous series of M" pictures may be used. Nevertheless, the actual distance M' may be verified, e.g., after every P-picture.

(ii) Non-Progressive Refresh

For non-progressive refresh, there may be an optional GOP header following the sequence header. Then, a picture layer follows. The first picture immediately following a sequence header, or a GOP header, has to be an I-picture. For an intelligent bit allocation, we need to know both N and M. We can, however, start transcoding of a pre-compressed bitstream with any reasonable pair of N and M, say N' and M', and with a bit budget of $R=R_{GOP,N}=N' \cdot$(bit_rate/frame_rate) bits in determining the target rate for the first I-picture (see eqn. 6).

Note that with N' and M', we have $N_I=1$, $N_P=N'/M'-N_I$ and $N_B=N'-N_I-N_P$. The actual value of M, say M", can then be calculated from the temporal references of the first two pictures, similar to progressive refresh. If the second picture is an I- or P-picture, eqn. (13) is used in calculating the value of M. Otherwise, the second picture is a B-picture, and eqn. (12) is used. We then set M=M".

If the second picture is also an I-picture (GOP(N=M=1) and $\text{GOP}_0$(N=M)), we actually have had the correct N value too, i.e., N=M, as shown in Table 1(b) and 2(b). The remaining number of bits, R (see eqn. 7), is adjusted accordingly, as:

$$R = R - (N' - 1) \cdot \frac{\text{bit\_rate}}{\text{frame\_rate}}. \quad (16)$$

This is because there are no P- and B-pictures between the first and second I-pictures. Hence, the bits allocated to the assumed N–1 (P and B) pictures between two I pictures should be deducted from R.

If the second picture is not an I-picture, it will take somewhat longer to obtain the correct value of N, by about one GOP. The assumed N' may not be dividable by the correct M. Hence, we need to adjust N', and accordingly, $n_P$ and $n_B$. We adjust N to N" with the correct M value, and $n_P$ and $n_B$, as $$N''=(N'/M) \cdot M; \quad (17)$$

$$n_P=N''/M-1; \text{ and} \quad (18a)$$

$$n_B=N''/M-n_P-1. \quad (18b)$$

We then adjust the remaining number of bits, R (see eqn. 7), with N" as $$R = R + (N'' - N') \cdot \frac{\text{bit\_rate}}{\text{frame\_rate}}. \quad (19)$$

Furthermore, if the second picture is a P-picture, GOP(N, M=1) or $\text{GOP}_0$(N,M) as shown in Tables 1(b) and 2(b), the remaining number of bits, R, needs additional adjustment as $$R = R - (M-1) \cdot \frac{\text{bit\_rate}}{\text{frame\_rate}} \quad (19b)$$

This is because there are M−1 fewer B-pictures than assumed before the first I-picture.

There can be only three scenarios, i.e.,

1. N"=N, that is, the current GOP length N" is equal to the actual GOP length N;
2. N"<N, that is, the current GOP length N" is smaller than the actual GOP length N; and
3. N">N, that is, the current GOP length N" is greater than the actual GOP length N.

Clearly, if N=N", we will reach an I-picture after processing N" pictures—the beginning of the second GOP. We have a correct N, so we maintain it.

If N"<N, the GOP length is shorter than the actual GOP length. The assumed GOP length is at least M pictures shorter than the actual GOP length because of the nature of the GOP structure (see Tables 1(b) and 2(b)). Here, we have assumed that the value of M will not change within a GOP.

Note that M may be checked periodically within a GOP, such as after each I- and/or P-picture, if there is a chance that M may change within a GOP. Additionally, if M changes within the GOP, N and R should be adjusted accordingly.

We extend the GOP of N" pictures by M additional pictures, i.e., $$N'' = N'' + M, \quad (21)$$

and adjust R by adding $R_{GOP,M}$ additional bits for the M additional pictures, i.e., $$R = R + R_{GOP,M} = R + M \cdot \frac{\text{bit\_rate}}{\text{frame\_rate}}. \quad (22)$$

If the extended GOP length is still shorter than the actual GOP length, we repeat the above procedure until reaching the end of the actual GOP.

If N">N, the GOP length is longer than the actual GOP length. At the end of the actual GOP, we will have a correct GOP length, N, and we will use the correct length N for the rest of the GOPs. Since the assumed GOP length (N" ) is longer than the actual GOP length (N), there will be some bits left over from the first actual GOP for coding pictures in the second actual GOP. Hence, the bits allocated for the second actual GOP need to be adjusted as:

$$R = 2R_{GOP,N} - (R_{GOP,N''} - R) = 2N \cdot \frac{\text{bit\_rate}}{\text{frame\_rate}} - \left(N'' \cdot \frac{\text{bit\_rate}}{\text{frame}} - R\right) \quad (23)$$

where $R_{GOP,N''}$−R is the number of bits used for encoding the first N pictures.

FIG. 4(b) illustrates a coding method for a non-progressive refresh picture sequence in accordance with the present invention. The aforementioned bit allocation technique for non-progressive refresh sequences is summarized as follows.

At block "A" processing continues from block "A" of FIG. 4(a). At block 500, an assumed GOP length N' is provided, and at block 502, an assumed distance M' is provided. M' here is a distance between the first I-picture in a GOP and the next I- or P-picture in the display order. This distance may or may not be the same as the GOP length. Generally, compatible values of N' and M' should be selected, for example, N'>M' and N' is dividable by M'. At block 504, an assumed bit budget R is provided according to N', and at block 505, a target bit rate T is determined, e.g., using eqn. 6, for coding the pictures in the GOP.

At block 506, the first picture in the GOP is coded. At block 508, if the next picture, e.g., the second picture of the GOP, is an I-picture, processing continues at block 510, where the actual distance M" is determined using eqn. 13. At block 514, M is set to M", and at block 516 N is set to M since the distance M' and the GOP length are the same.

At block 518, the bit budget is adjusted according to eqn. 16, and at block 524 processing returns, e.g., to block 500. Note that, at blocks 500 and 502, N' and M' can be set to the values N and M, respectively, of the previous GOP. N and M can be verified for each GOP.

At block 508, if the next picture, e.g., the second picture in the GOP, is a P-picture, processing continues at block 530, where the actual distance M" is determined using eqn. 13. At block 532, M is set to M". At block 534, the GOP length is updated as N"=M[N'/M']. At block 536, the remaining number of B-pictures in the current GOP, $n_B$, is adjusted using eqn. 18. At block 538, the bit budget is adjusted using eqn. 19, and at block 540, the bit budget is adjusted again, using eqn. 19b, and processing continues at "B".

At block 508, if the next picture, e.g., the second picture in the GOP, is a B-picture, processing continues at block 542, where the actual distance M" is determined using eqn. 12. At block 544, M is set to M". At block 546, the GOP length is updated as N"=M[N'/M']. At block 548, the remaining number of B-pictures in the current GOP, $n_B$, is adjusted using eqn. 18. At block 550, the bit budget is adjusted using eqn. 19, and processing continues at "B".

Figures 2, 4C:
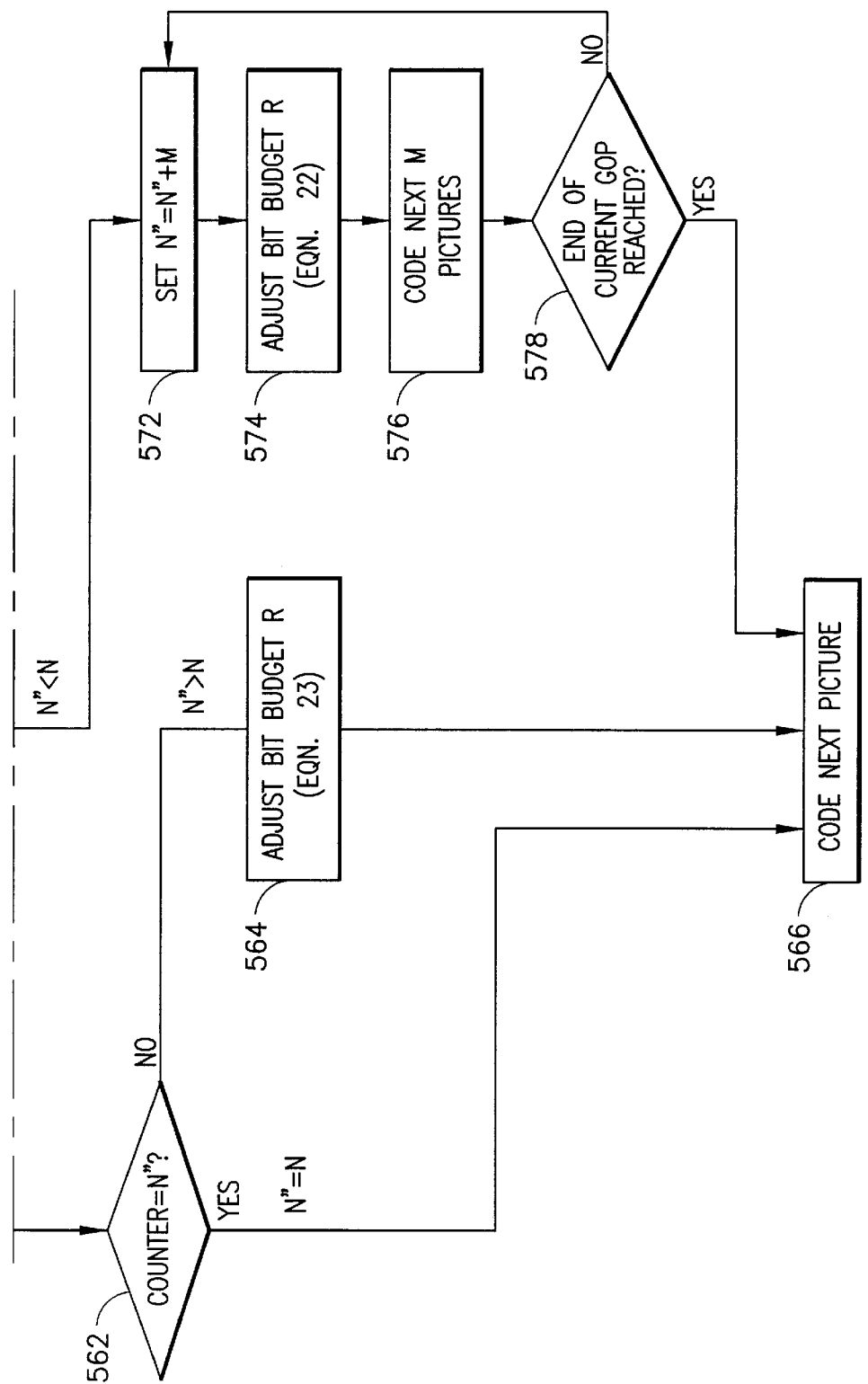
FIG. 4(c) illustrates a continuation of the coding method of FIG. 4(b) in accordance with the present invention.

FIG. 4(c) illustrates a continuation of the coding method of FIG. 4(b) in accordance with the present invention. Processing continues at "B" from FIG. 4(b). At block 552, the target bit rate T is set using eqn. 6, and at block 554, a counter is set to one. At block 556, the next picture in the GOP is coded. At block 558, counter is incremented. "Counter" essentially tracks the position of the current picture in the GOP. At block 560, a determination is made as to whether the end of the current GOP has been reached. If so, a determination is made at box 562 as to whether counter=N". If so, this indicates that N" is the same as N, the actual GOP length. Essentially, the assumed GOP length N" turned out to be correct. Processing continues at block 566, where the next GOP is coded.

If the condition at block 562 is false, this indicates that N">N (e.g., the assumed GOP length N" is too large), and the bit rate is adjusted at block 564 using eqn. 23. Processing continues at block 566, where the next GOP is coded.

If the end of the current GOP has not been reached yet at block 560, a determination is made at block 570 as to whether counter=N". If not, process continues at block 556. If counter=N" at block 570, this indicates that N"<N (e.g., the assumed GOP length N" is too small). At block 572, the assumed GOP length N" is incremented by M. at block 574, the bit budget is adjusted using eqn. 22, at block 576, the next M pictures are coded, and at block 578 a determination is made as to whether the end of the current GOP has been reached. If not, processing continues at block 572, where the assume GOP length N" is again incremented by M.

When the end of the current GOP is reached, at block 578, processing continues at block 566, where the next GOP is coded.

Figure 5:
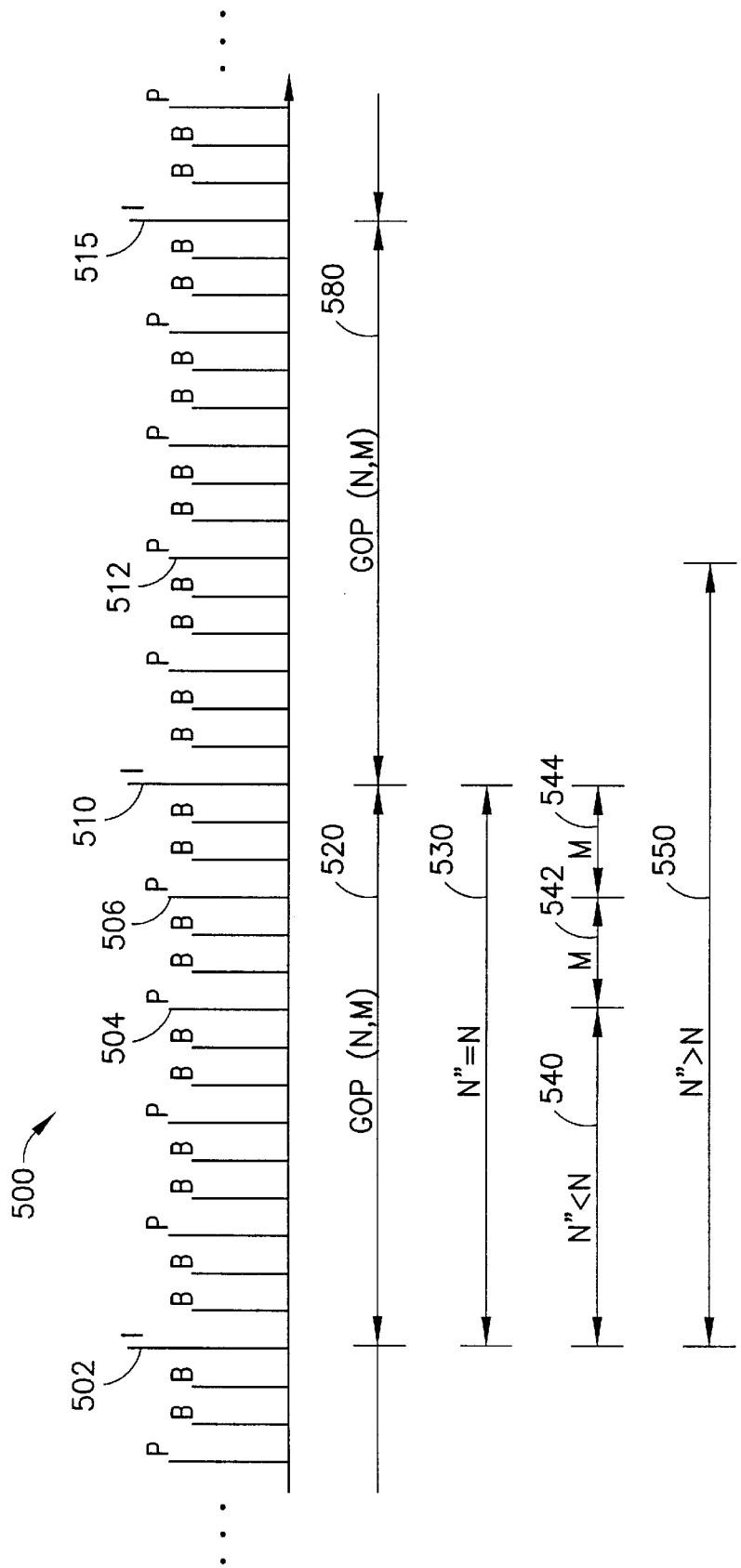
FIG. 5 illustrates an estimated GOP length N" in accordance with the present invention.

The coding method of FIG. 4(c) can be understood further with reference to FIG. 5.

FIG. 5 illustrates an estimated GOP length N" in accordance with the present invention. A sequence of pictures is shown generally, in display order, at 500. A first GOP, GOP(N,M) 520, begins at an I-picture 502, and the next GOP 580 begins at an I-picture 510. A subsequent GOP begins at an I-picture 515.

The estimated GOP length N" 530 is equal to the actual GOP length N. However, the estimated GOP length N" 540 is less than the actual GOP length N by two M distances 542 and 544. In particular, the estimated GOP length N" 540 extends from the I-picture 502 to a P-picture 504, the M-distance 542 extends from the P-picture 504 to a P-picture 506, and the M-distance 544 extends from the P-picture 506 to the I-picture 510. The estimated GOP length N" 550 extends from the I-picture 502 to a P-picture 512, and is therefore greater than the actual GOP length N. Generally, N" should be selected initially as a multiple of the estimated distance between I and/or P-pictures.

A C-language pseudo code for the bit-allocation procedure, both with and without progressive refresh, is shown below. The same algorithm is represented by the flowchart in FIGS. 7(*a*)–7(*d*). A single bitstream can switch arbitrarily between the progressive refresh and I-picture (non-progressive) refresh modes.

```
/*
 * The following is a brief description of the variables:
 *
 * N         Estimated open GOP length (pictures)
 * M         Number of consecutive B-pictures plus 1
 * N'        Initial guess for the GOP length in pictures
 * M'        Initial guess for the number of consecutive B-pictures plus 1
 * N"        Updated estimate of the open GOP length
 * M"        Updated estimate of number of consecutive B-pictures plus 1
 * R         Number of bits remaining in this GOP
 * n         Number of pictures remaining in this GOP
 * ni        Number of I-pictures remaining in this GOP
 * np        Number of P-pictures remaining in this GOP
 * nb        Number of B-pictures remaining in this GOP
 * Xi        Complexity of an I-picture
 * Xp        Complexity of a P-picture
 * Xb        Complexity of a B-picture
 * Ki        I-picture complexity divider
 * Kp        P-picture complexity divider
 * Kb        B-picture complexity divider
 * X         Complexity temporary variable
 * T         Target number of bits for the current picture type
 *
 * pict_type        Current picture type
 * prev_pict_type   Previous picture type in coding order
 * temp_ref         Current picture temporal reference
 * prev_temp_ref    Previous picture temporal reference (coding order)
 * prog_refresh     Non-zero if progressive refresh is in progress
 * GOP_flag         Non-zero if GOP header preceded the current picture
 * seq_hdr_flag     Non-zero if sequence header preceded current picture
 * bit_rate( )      Current average output bitrate
 * frame_rate( )    Average display frame rate using repeat_first_field
 *
 * Notes:
 *
 * 1) The "div" operation denotes computer integer division with
 *       truncation toward 0.
 *
 * 2) A GOP begins with a I-picture in coding order and extends to
 *       the next I-picture (exclusive) regardless of whether the GOP
 *       syntax is present in the bitstream. When progressive refresh
 *       is used a GOP consist of a P-picture plus the following run of
 *       consecutive B-pictures.
 */
FindSequenceHeader( );
N = N';            // (N' % M') == 0; N is estimated open GOP length
M = M';
R = 0;
n = 0;
prev_pict_type = B_PICTURE;
for(;;) {
        /*
         * get_picture_header( ) parses the video sequence and the optional
         * GOP layer, and returns the picture type and temporal reference
         * of the next coded picture.
         */
        pict_type = get_pict_header(&temp_ref, &GOP_flag, &seq_hdr_flag);
        if(seq_hdr_flag)
                prog_refresh = (pict_type != I_PICTURE);
        switch(pict_type) {
        case I_PICTURE:
                if(prev_pict_type != B_PICTURE) {
                        /*
                         * GOP(N=M=1), GOP(N,M=1) or GOP0(N=M). Recalculate
```

-continued

```
M,
                        * start new GOP and correct R for missing B pictures.
                        */
                        M" = GOP_flag ? (temp_ref + 1):
                                 ((temp_ref − prev_temp_ref + 1024) & 0x3FF);
                        R −= n * bit_rate( )/frame_rate( );
                        M = M";
                        N = (prev_pict_type == I_PICTURE) ? M:(N − n);
                        n = 0;
                  }
                  if(prog_refresh)            // End of progressive refresh
                        N = N';
                  prog_refresh = 0;
                  if(n <= 0) { // GOP length is equal to expected length
                        R += N * bit_rate( )/frame_rate( );
                  } else {            // GOP length is shorter than expected
                        N −= n;
                        N = (N div M) * M;
                        R += (N − n) * bit_rate( )/frame_rate( );
                  }
                  n = N;
                  ni = 1;
                  np = N/M − 1;
                  nb = N − ni − np;
                  X = Xi/Ki;
                  prev_temp_ref = temp_ref;
                  break;
            case P_PICTURE:
                  if(prev_pict_type != B_PICTURE) {
                        /*
                        * GOP(M=1) or GOP0(M)                  [progressive
refresh]
                        * GOP(N,M=1) or GOP0(N,M)             [non-progressive
refresh]
                        /*
                        M" = (temp_ref − prev_temp_ref + 1024) & 0x3FF;
                        R −= (M − 1) * bit_rate( )/frame_rate( );
                        nb −= M − 1;
                        n −= M − 1;
                        if((M" != M) && !prog_refresh) {
                              N" = (N div M") * M";       // open, not actual, GOP
length
                              n += (N" − N) − (M" − M);
                              R += ((N" − N) − (M" − M)) * bit_rate( )/frame_rate( );
                              np = n div M";
                              nb = n − np;
                              N = N";
                        }
                        M = M";
                  }
                  if(n <= 0) {
                        /*
                        * End of GOP in progressive refresh mode or GOP is
                        * longer than expected in non-progressive refresh
mode.
                        */
                        N += M;
                        R += M * bit_rate( )/frame_rate( );
                        n = M;
                        ni = 0;
                        np = 1;
                        nb = M − 1;
                  }
                  X = Xp/Kp;
                  prev_temp_ref = temp_ref;
                  break;
            case B_PICTURE:
                  if(prev_pict_type != B_PICTURE) {
                        /*
                        * GOP(N=M), GOP(N,M), GOP0(N,M) [non-progressive
refresh]
                        * GOP(M)
[progressive refresh]
                        */
                        M" = (prev_temp_ref − temp_ref + 1025) & 0x3FF;
                        if(M" != M) {
                              if(prog_refresh) {
                                    nb += M" − M;
                                    R += (M" − M) * bit_rate( )/frame_rate( );
```

```
            } else {
                    N" = (N div M") * M";
                    n += N" - N;
                    R += (N" - N) * bit_rate( )/frame_rate( );
                    np = (n + 1) div M" - 1;
                    nb = n - np;
                    N = N";
            }
            M = M";
        }
    }
    X = Xb/Kb;
    break;
}
/*
 * Calculate the target bit rate
 */
T = X * R/(ni*Xi/Ki + np*Xp/Kp + nb*Xb/Kb);
switch(pict_type) {          // Decrement pic count for each picture type
        case I_PICTURE: ni--; break;
        case P_PICTURE: np--; break;
        case B_PICTURE: nb--; break;
}
n = n - 1;                   // Number of pictures left in GOP
prev_pict_type = pict_type;
/*
 * transcode_picture( ) does the actual transcoding which maintains
 * in original picture type (I, P or B). This function returns
 * the actual size of the transcoded picture in bits. This func-
 * tion updates the complexity (Xi, Xp, Xb) for each picture type.
 */
R -= transcode_picture(pict_type, T);
}
```

This pseudo-code is expressed in a flowchart 700 in FIGS. 7(a)–7(d). Note that ni, np and nb are the same as $n_I$, $n_P$ and $n_B$, respectively, as used elsewhere.

Box 702 denotes searching for the video sequence header in order to obtain parameters necessary to begin transcoding. Initialization for the loop over transcoded pictures occurs here.

Box 704 is the call to "get_pict_header ( )" which consumes the picture header and all higher level syntax. The picture type (I, P or B picture) is returned. "GOP_flag" is true (non-zero) if a GOP header was encountered; "seq_hdr_flag" is true (non-zero) if a video sequence header occurred before the current coded picture and after the previous coded picture.

Box 706 tests "seq_hdr_flag". If true, "prog_refresh" is set to 1 (true) if the current picture is not an I-picture in box 708.

Box 710 is the switch statement based on picture types. Although not shown in the code or flowchart, an MPEG-2 D-picture is treated like an I-picture in this algorithm.

If the previous picture type was not a B-picture (box 712), then a new value of M is determined from the temporal references. If the GOP is being shortened, the excess bits due to the expected GOP length are deleted from "R" and the new values of "M", "N", "n" are set (box 714). "R" is the target number of bits (not the actual number) remaining to code the rest of the GOP. If the actual GOP size is different, the difference in bits (positive or negative) remains in "R" and affects the target size for the next GOP. This forms a feedback loop to drive the average GOP size to "N*bit_rate ( )/frame_rate ( )".

The function "bit_rate ( )" returns the current target transcoder output bit rate which may change due to channel capacity or statistical multiplexing considerations. The function "frame_rate ( )" is the average coded frame rate, which is the frame rate specified in the video sequence header modified by the effects of the repeat_first_field flag in the various coded pictures. The quantity "bit_rate ( )/frame_rate ( )" denotes the desired current average coded picture size (in bits) to be output by the transcoder. It is an average because it does not consider the different MPEG picture types. Thus the target number of bits for a GOP, "N * bit_rate ( )/frame rate ( )", is N (the GOP length in pictures) times the average picture size.

If the transcoder is operating in progressive refresh mode, this mode is disabled because the current picture is an I-picture and N is set to the initial guess for GOP length (boxes 716 and 718).

If the condition in 720 is true, the correct value of "N" has been used. In this case, R is updated with the number of bits needed for a new GOP of length N (box 722). If the 720 condition is false, the our previous estimate of "N" is wrong (the GOP is shorter than expected) and N and R are updated accordingly (box 724).

Box 726 resets the picture type down counters ("ni", "np", "nb") according to the GOP type, the number of picture to go in the GOP (n), calculates the normalized I-picture complexity (X) and updates the previous picture type.

Box 728 is the start of the P-picture case in the switch statement. If the previous picture was not a B-picture (box 730), then a new value of M (M") is calculated from the temporal references. The difference between the two 10-bit temporal reference number will be negative a wrap around occurred; this is why 1024 is added. When no wrap around occurs, the 0x3FF, which is the hexadecimal representation of the binary number 1111111111, removes the addition of $2^{10}$ bit leaving the positive difference; otherwise the addition of 1024 make the negative difference positive and this result is not modified by the bit-wise AND operation. Since the previous picture was not a B-picture, potential corrections to "n" (number of pictures left in the GOP), "nb" (number of B-picture left in the GOP) and "R" (number of bits allocated for the remaining picture in the GOP) may be required.

If M has changed and the transcoder is not in progressive refresh mode (box 732), then corrections to "N", "n", "np", "nb" and "R" are made in box 734.

Box 736 updates M (previously calculated in M").

If the end of GOP has been reached, (n less than or equal to zero—box 738), then the GOP is actually longer than expected. In this case, the values of "N", "R", "n", "ni", "np" and "nb" are updated to reflect an increase GOP length of M pictures (one P-picture and M−1 B-pictures) in box 740.

Box 742 calculates the normalized P-picture complexity, "X", and resets "prev_temp_ref" to be the current temporal reference.

For B-pictures, where the previous picture was not a B-picture (conditional in box 744), the new value of M (in M") is computed.(see box 746) from the difference in temporal reference. This calculation provide for the possibility that the 10-bit temporal reference may have wrapped around (hence the +1024 and the mask to 10 bits).

If the value of M has changed (condition tested in box 748), then the state variables must be updated depending on "prog_refersh" (box 750). In the progressive refresh case, "nb" and "R" need to be modified (box 752). If I-picture refresh is in progress, "N", "np", "nb", "n" and "R" all need to change (box 754).

A new normalized complexity for B-picture is computed in box 758.

Following the switch statement, the target size, "T", for the next picture is calculated in box 760. This number is the intended size of the current picture when transcoded to the new bit rate. The actual size, returned by "transcode_picture( )" is used to decrement R (see box 770). Following the calculation of "T", the number of picture remaining in the GOP, "n", and the number of pictures of the current type ("ni", "np" or "nb") must be decremented (see boxes 762 to 768).

3. Difference in Target Rates

The target bit rates for a picture determined with different sets of GOP parameters can be different (see equations 5 and 6). We now analyze the differences in target rates with and without a correct starting GOP structure. For sake of simplification in analysis, we assume that:

1. The transcoder can meet the target rate at each picture. This implies that the remaining number of bits at the end of a GOP is equal to zero, and that a GOP of N pictures is assigned exactly $R_{GOP,N}=N\cdot(\text{bit\_rate}/\text{frame\_rate})$ bits.
2. Within a GOP, all the pictures of the same type have the same complexity measure.
3. We have a correct M value. In fact, we can have a correct M right after reading the header of the second picture.

Note that the above assumptions are only for simplifying the analysis, and may not be 100% true for a real transcoder. For example, a transcoder may not 100% meet the target rate at a frame, and therefore at the end of a GOP, the remaining number of bits R may not be zero bits.

It has been shown that with conditions 1 and 2, equations (5) and (6) will be identical. That is, all the pictures of the same type in a GOP are assigned the same number of bits. We use eqn. (5) in our analysis of differences in target rates. Assume that a pre-compressed bitstream is coded with a set of GOP parameters as follows:

$$N, M \rightarrow N_I, N_P, N_B$$

For comparison, we start transcoding of the pre-compressed bitstream with two different GOP structures, one with a correct GOP structure (I) and the second with an incorrect GOP structure (II) as follows:

$$\text{Starting GOP(I): } N, M \rightarrow N_I, N_P, N_B$$

$$\text{Starting GOP(II): } N', M' \rightarrow N_I, N_P, N_B$$

Let $T_n$ and $T'_n$ be the target rates for frame n with GOP(I) and GOP(II), respectively. The difference between these two target rates is:

$$\Delta = T_n - T'_n = \left(1 - \frac{T'_n}{T_n}\right)\cdot T_n \tag{24a}$$

$$= \left(1 - \frac{\frac{X_{n,t}}{K_{n,t}}}{N'_I \frac{X_I}{K_I} + N'_P \frac{X_P}{K_P} + N'_B \frac{X_B}{K_B}} R_{GOP,N'} \div \frac{\frac{X_{n,t}}{K_{n,t}}}{N_I \frac{X_I}{K_I} + N_P \frac{X_P}{K_P} + N_B \frac{X_B}{K_B}} R_{GOP,N}\right)\cdot T_n \tag{24b}$$

$$= \left(1 - \frac{N_I \frac{X_I}{K_I} + N_P \frac{X_P}{K_P} + N_B \frac{X_B}{K_B}}{N'_I \frac{X_I}{K_I} + N'_P \frac{X_P}{K_P} + N'_B \frac{X_B}{K_B}} \cdot \frac{N'}{N}\right)\cdot T_n \tag{24c}$$

$$= \frac{(NN'_I - N'N_I)\frac{X_I}{K_I} + (NN'_P - N'N_P)\frac{X_P}{K_P} + (NN'_B - N'N_B)\frac{X_B}{K_B}}{\left(N'_I \frac{X_I}{K_I} + N'_P \frac{X_P}{K_P} + N'_B \frac{X_B}{K_B}\right)} \cdot \frac{1}{N} \cdot T_n. \tag{24d}$$

To better understand this difference in target bit rate, let us examine two numerical examples. In the first example, we assume the starting GOP (II) is shorter than the actual GOP, i.e.,

N=15 M=3→$N_I$=1 $N_P$=4 $N_B$=10

N'=12 M'=3→$N'_I$=1 $N'_P$=3 $N'_B$=8

If we set $K_I=K_P=1$ and $K_B=1.4$, and use the complexity measures as initialized in MPEG TM5, i.e., $X_I=160\cdot\text{bit\_rate}/\text{frame\_rate}$ $X_P=60\cdot\text{bit\_rate}/\text{frame\_rate}$ $X_B=40\cdot\text{bit\_rate}/\text{frame\_rate}$ \hfill (25)

we have the difference between the two target rates as follows:

$$\Delta = T_n - T'_n = \frac{(15-12)X_I + (15 \cdot 3 - 12 \cdot 4)X_P + (15 \cdot 8 - 12 \cdot 10)X_B/1.4}{(X_I + 3X_P + 8X_B/1.4)} \cdot \frac{1}{15} \cdot T_n = 3.5\% \cdot T \quad (26)$$

Here, the target rate with a priori knowledge of the GOP structure is 3.5% higher than the rate without a priori knowledge of the GOP structure using the rate control system of the present invention. A shorter GOP results in smaller target rates for all three types of pictures.

In the second numerical example, the starting GOP (II) has a length longer than the actual one, i.e.,

N=15 M=3→N$_I$=1 N$_P$=4 N$_B$=10
N'=18 M'=3→N'$_I$=1 N'$_P$=5 N'$_B$=12

The difference in target rates is $$\Delta = T_n - T'_n = \frac{(15-18)X_I + (15 \cdot 5 - 18 \cdot 4)X_P + (15 \cdot 12 - 18 \cdot 10)X_B/1.4}{(X_I + 5X_P + 12X_B/1.4)} \cdot \frac{1}{15} \cdot T_n = -1.7\% \quad (27)$$

Here, the target rate with a priori knowledge of the GOP structure is 1.7% lower than the rate without a priori knowledge of the GOP structure using the rate control system of the present invention. A longer GOP results in the assignment of more bits to all the pictures of three types.

The differences in target bit rates will remain until the end of either the starting GOP or the actual GOP, depending on whether the starting GOP is shorter or longer than the actual GOP length.

If the starting GOP is shorter than the actual GOP (i.e. N'<N), at the end of the starting GOP, we will extend the GOP of N' pictures by M pictures with additional bits of $R_{GOP,M}$. The remaining number of bits is therefore equal to $$R = R + R_{GOP,M} = M \cdot \frac{bit\_rate}{frame\_rate} \quad (28)$$

Note that we have assumed R=0 at the end of the starting GOP of N' pictures. The additional M pictures actually form another GOP of N=M pictures with N'$_I$=0, N'$_P$=1 and N'$_B$=M−1, and a bit budget of M·(bit_rate/frame_rate) bits. The differences in target rates for the M additional pictures of either P or B type (see eqn. 24) can be simplified as:

$$\Delta = T_n - T'_n = \quad (29)$$

$$\frac{(-MN_1)\frac{X_1}{K_1} + (N - MN_P)\frac{X_P}{K_P} + (NN'_B - MN_B)\frac{X_B}{K_B}}{\left(\frac{X_P}{K_P} + N'_B\frac{X_B}{K_B}\right)} \cdot \frac{1}{N} \cdot T_n$$

For the first numerical example, the difference in target bit rates is:

$$\Delta = T_n - T'_n = \quad (30)$$

$$\frac{(-3)X_1 + (15 - 3 \cdot 4)X_P + (15 \cdot 2 - 3 \cdot 10)X_B/1 \ldots 4}{(X_P + 2X_B/1.4)} \cdot \frac{1}{15} \cdot T_n = 17.0\% \cdot T_n$$

Here, the target rate with a priori knowledge of the GOP structure is 17.0% higher than the rate without a priori knowledge of the GOP structure using the rate control system of the present invention. Relatively more bits are assigned to the pictures of the extended GOP since relatively fewer bits were assigned to the previous pictures. If the extended GOP of M pictures still cannot end the actual GOP of N pictures, we repeat the above procedure until reaching the end of the actual GOP. The differences in target rates for the pictures in the extended GOPs of M pictures will remain the same because all the extended GOPs of M pictures have the same pattern of picture organization and the same bit budget.

At the end of the first actual GOP of N pictures and also at the end of the last extended GOP of M pictures, we have complete information about the actual GOP structure with the remaining number of bits R=0. Hence, from the second GOP, there will be no difference in target rates. Two target rates with and without a priori knowledge of GOP structure using the rate control system of the present invention will be the same from the second actual GOP.

On the other hand, if the assumed starting GOP length is longer than the actual GOP length (i.e. N'>N), at the end of the actual GOP, we have the complete information about the actual GOP structure, but the remaining number of bits R≠0. That is, there will be some left over bits to allocate over the second (actual) GOP. Hence, instead of simply giving $R_{GOP,N}$ bits to the second (actual) GOP, we have to adjust R as R=2$R_{GOP,N}$−($R_{GOP,N'}$−R) (see eqn. 23). The target bit rates with correct and incorrect starting GOP structures will still not be the same in the second (actual) GOP. The difference in target rates in the second (actual) GOP is $$\Delta = T_n - T'_n \quad (31a)$$

$$= \frac{\frac{X_{n,t}}{K_{n,t}}}{N_I\frac{X_I}{K_I}X_I + N_P\frac{X_P}{K_P} + N_B\frac{X_B}{K_B}}(R_{GOP,N} - (2R_{GOP,N} - (R_{GOP,N'} - R))) \quad (31b)$$

$$= \frac{\frac{X_{n,t}}{K_{n,t}}}{N_I\frac{X_I}{K_I}X_I + N_P\frac{X_P}{K_P} + N_B\frac{X_B}{K_B}}(-R_{GOP,N} + (R_{GOP,N'} - R)) \quad (31c)$$

Here, $R_{GOP,N'}$−R is the number of bits assigned for the first N pictures, which is equal to:

$$R_{GOP,N'} - R = \frac{N_I \frac{X_I}{K_I} + N_P \frac{X_P}{K_P} + N_B \frac{X_B}{K_B}}{N'_I \frac{X_I}{K_I} + N'_P \frac{X_P}{K_P} + N'_B \frac{X_B}{K_B}} R_{GOP,N'}. \quad (32)$$

Hence, the difference in target rate becomes:

$$\Delta = \frac{\frac{X_{n,t}}{K_{n,t}}}{N_I \frac{X_I}{K_I} + N_P \frac{X_P}{K_P} + N_B \frac{X_B}{K_B}} \left( -R_{GOP,N} + \frac{N_I \frac{X_I}{K_I} + N_P \frac{X_P}{K_P} + N_B \frac{X_B}{K_B}}{N'_I \frac{X_I}{K_I} + N'_P \frac{X_P}{K_P} + N'_B \frac{X_B}{K_B}} R_{GOP,N'} \right) \quad (33a)$$

$$= -\frac{(NN'_I - N'N_I)\frac{X_I}{K_I} + (NN'_P - N'N_P)\frac{X_P}{K_P} + (NN'_B - N'N_B)\frac{X_B}{K_B}}{\left( N'_I \frac{X_I}{K_I} + N'_P \frac{X_P}{K_P} + N'_B \frac{X_B}{K_B} \right)} \cdot \frac{1}{N} \cdot T_n \quad (33b)$$

By comparing equations (24) and (33), we should see the differences in target rates in the first and second actual GOP have the same absolute values, but different signs. In fact, a longer starting GOP uses more bits for the first actual GOP and therefore leaves less bits for the second actual GOP. For the second numerical example, the differences in target rates for pictures in the second actual GOP are:

$$\Delta = T_n - T'_n = 1.7\% \cdot T'_n \quad (34)$$

At the end of the second actual GOP, the remaining number of bits R=0. The third actual GOP will be assigned $R_{GOP,N}$ bits. From the third actual GOP, there will be no difference in target rates.

Target rates with respect to frame number for the two numerical examples were analyzed. The target rate with a correct starting GOP(N=15, M=3) was the benchmark for comparison. Comparative data was obtained for a starting GOP(N=12, M=3), and for a starting GOP(N=18, M=3). It was verified that all the pictures of the same type are assigned the same number of bits. Moreover, if the starting GOP is shorter than the actual GOP, fewer bits are assigned to the pictures before the end of the starting GOP, and more bits are assigned to the pictures of an extended GOP of M pictures. There is no difference in target rates starting from the second actual GOP.

On the other hand, if the starting GOP is longer than the actual one, slightly more bits are assigned to the pictures in the first actual GOP and fewer bits for the pictures in the second actual GOP. From the third actual GOP, the target rates are the same.

4. Simulation Results

Simulations were conducted in evaluating the rate control system of the present invention. Test sequences were first coded at a bit rate of 15 Mbits/sec. with different sets of GOP parameters, as shown in Table I. The compressed bitstreams were then transcoded to a new rate of 3 Mbits/s with a starting GOP of N=15 and M=3.

|   | GOP1 | GOP2 | GOP3 |
|---|------|------|------|
| N | 30   | 12   | 8    |
| M | 3    | 2    | 1    |

Target rates were analyzed for a correct starting set of GOP parameters, and for a starting GOP of N=15 and M=3.

Note that, in practice, a transcoder (or encoder) may not always meet the target rates at each frame. Hence, the remaining number of bits at the end of each GOP, R, may not be zero. The non-zero R will be passed to the next GOP (see eqn. 8). This implies that GOPs may be given slightly different number of bits. It was seen that a longer starting GOP assigns more bits for the pictures in the first GOP, as compared with a correct starting GOP. Hence, fewer bits are left for the pictures in the second GOP. The target rates with correct and incorrect GOP starts converging at the third GOP. On the other hand, a shorter starting GOP results in smaller target rates for the first few pictures and then more bits for the rest in the first GOP. Target rates become close from the second GOP.

To prove the effectiveness of the bit rate allocation system under a variety of test conditions, a sequence was coded with various GOP lengths, e.g., N=15, 12, 12, 18, 18, 15, 15, 9, 9, 30. Target rates were analyzed at each GOP for the correct GOP length, and by using the previous GOP structure length as the starting GOP length for each GOP. The results were close with this stress test.

Figure 6:
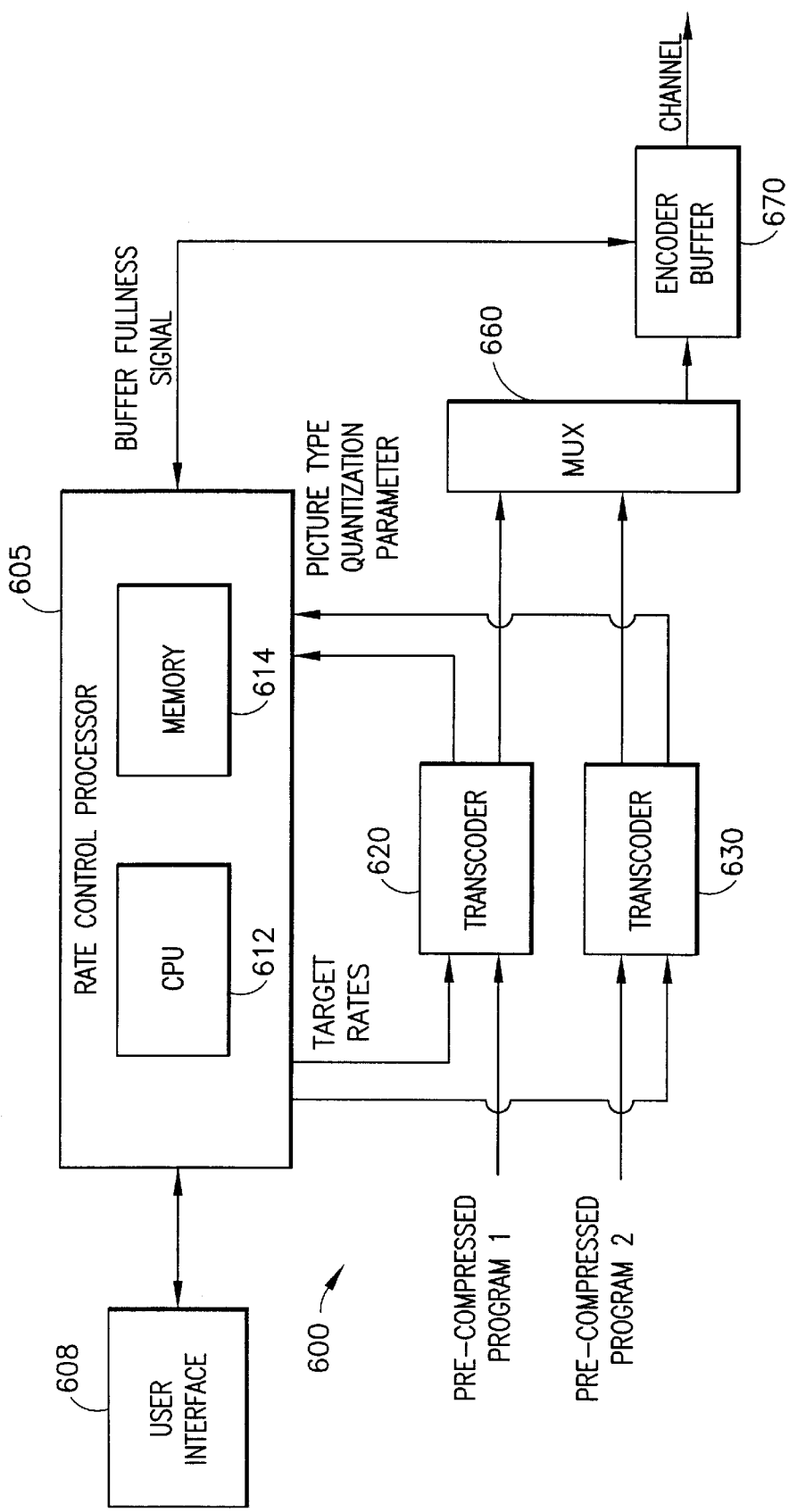
FIG. 6 illustrates a rate control system in accordance with the present invention.
Figures 2, 7A:
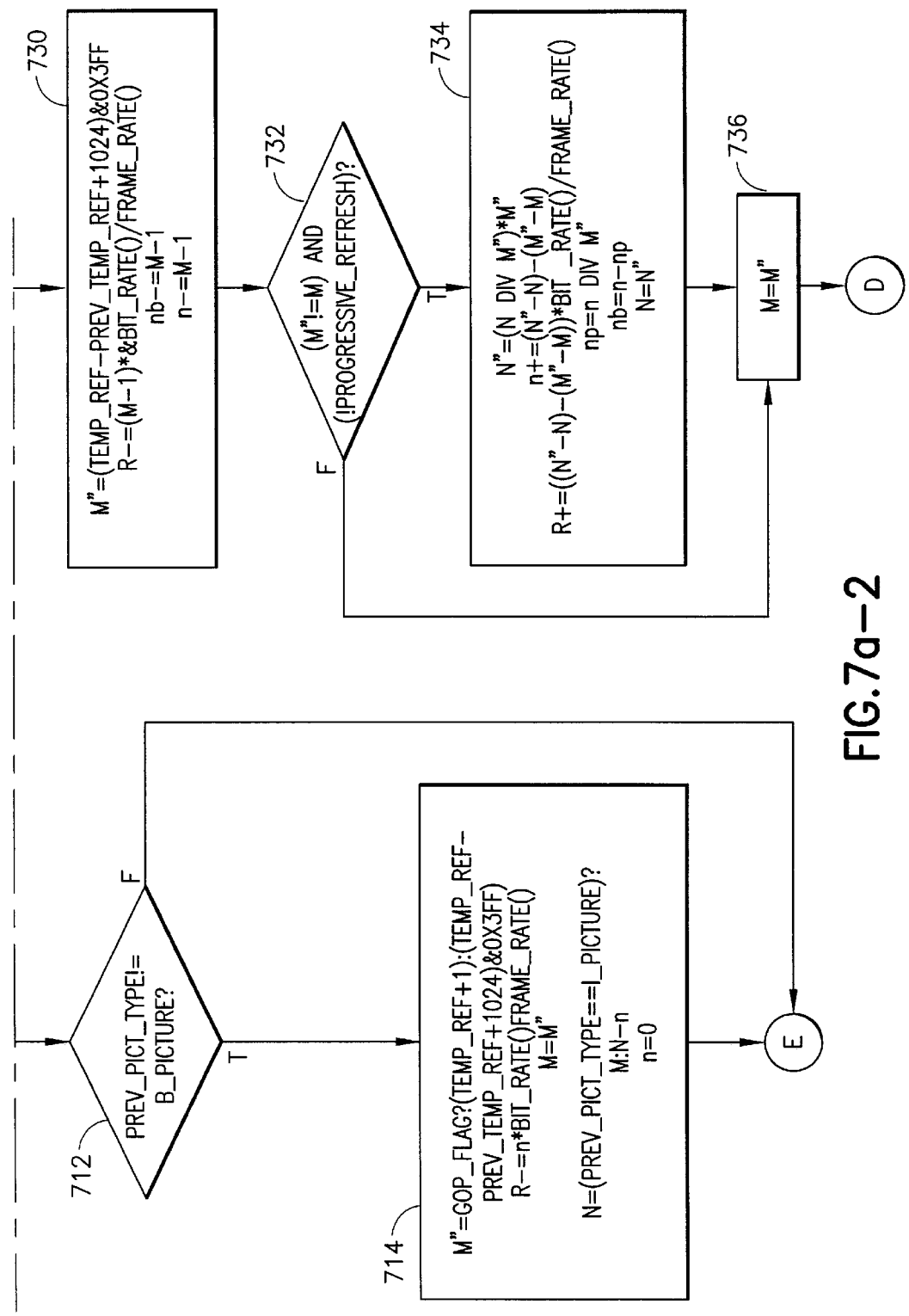
FIGS. 7(a)–7(d) illustrate a C-language flowchart for implementing the present invention.
Figure 7B:
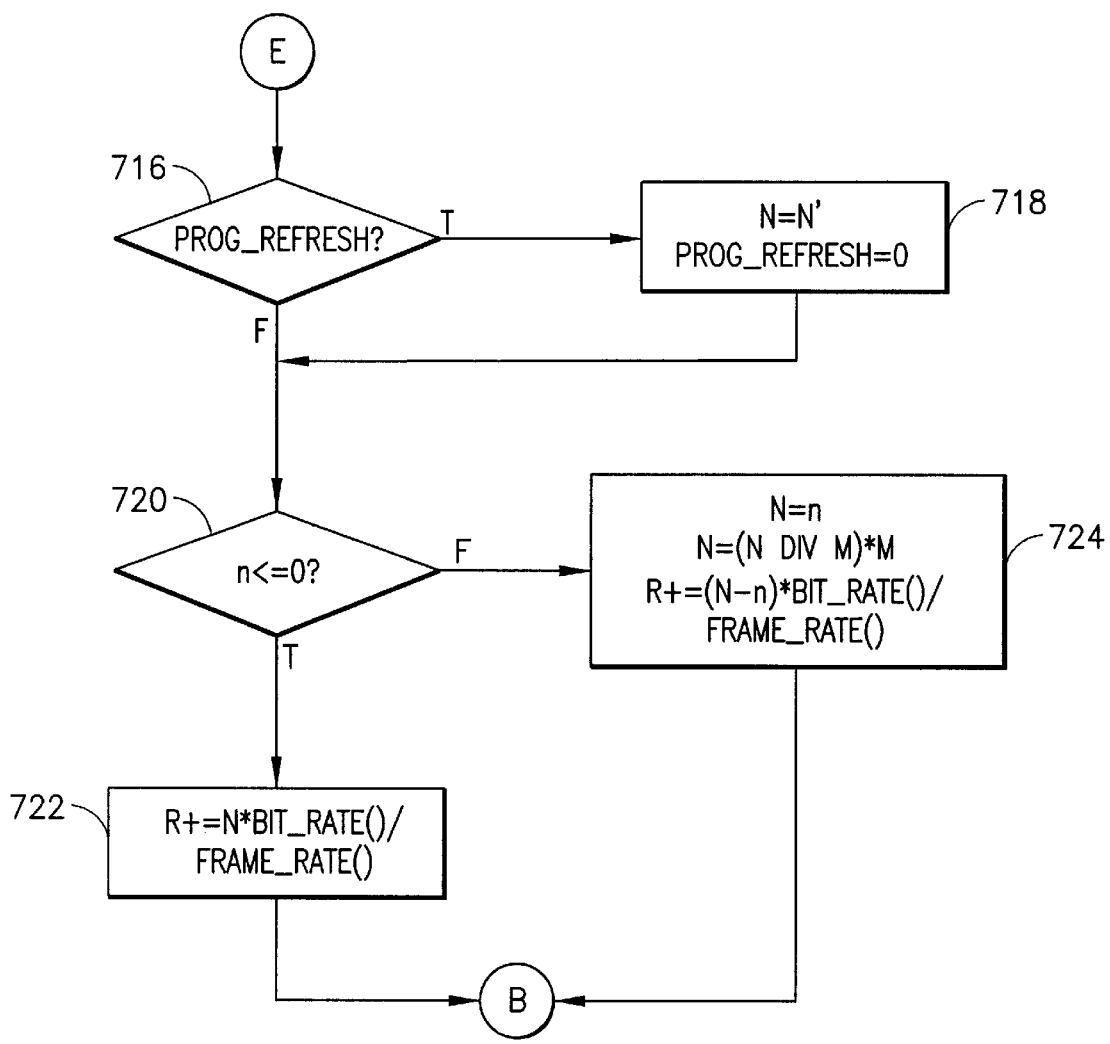
Figures 2, 7C:
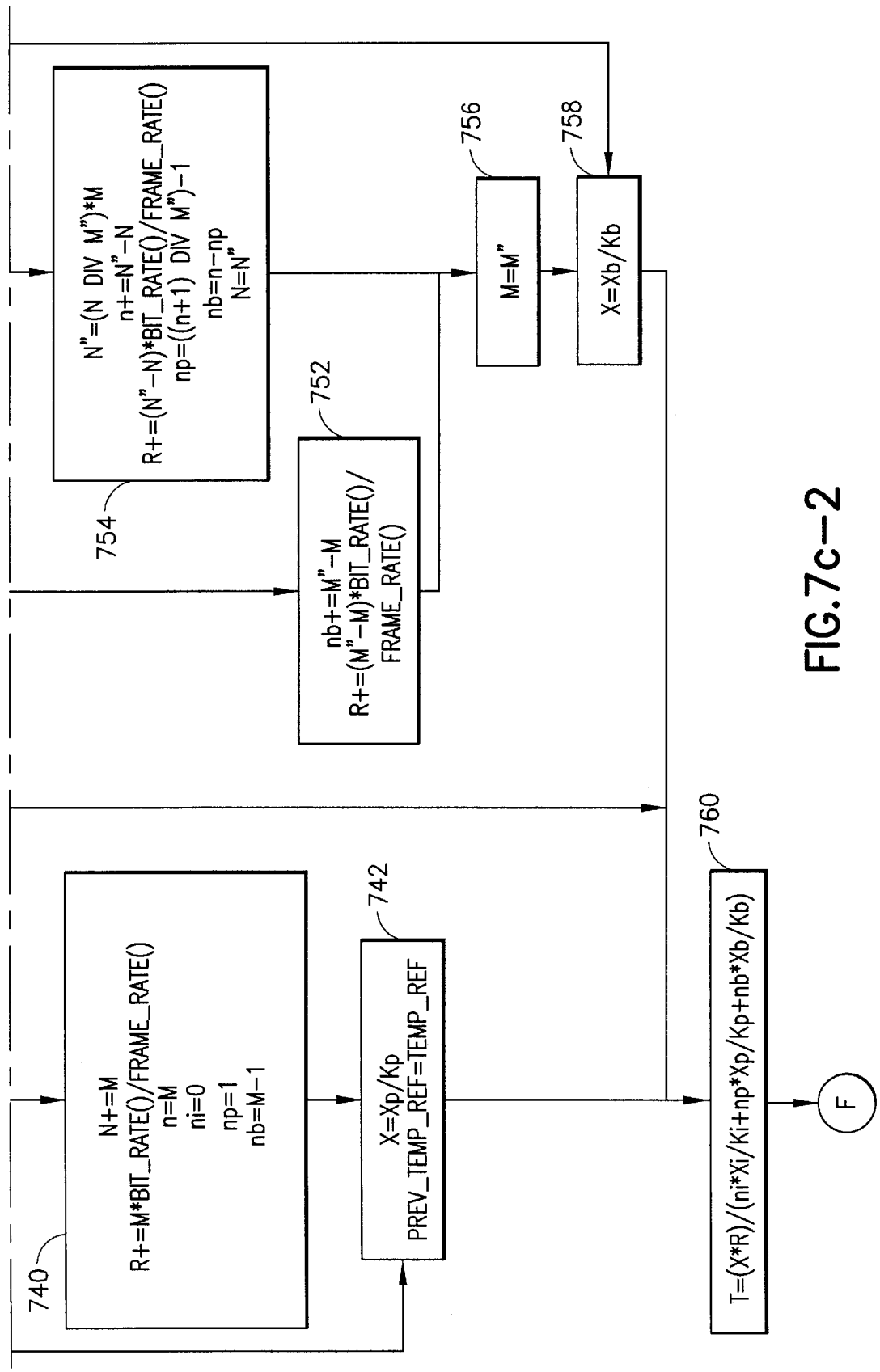
Figure 7D:
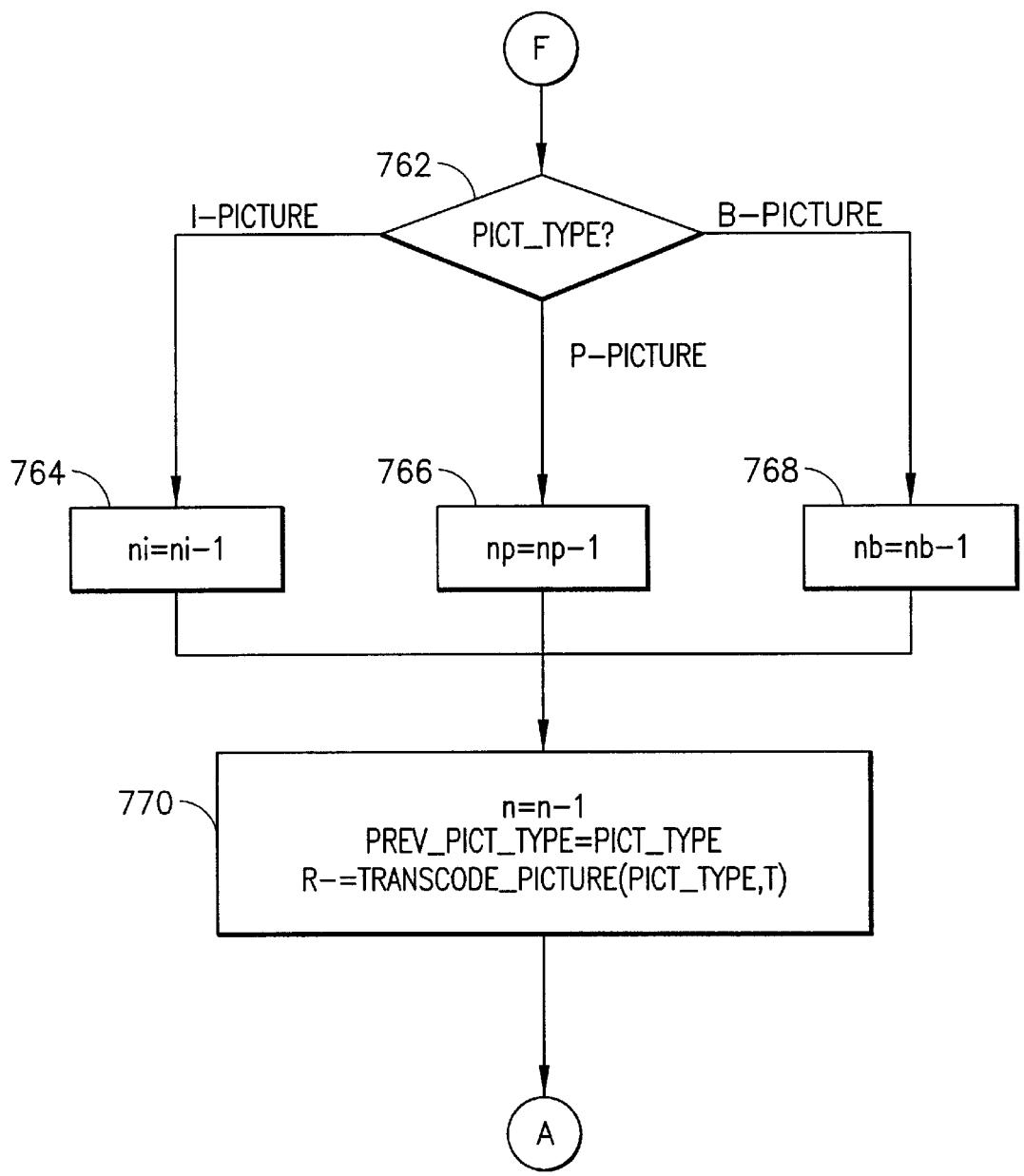

FIG. 6 illustrates a rate control system in accordance with the present invention. Pre-compressed bitstreams, e.g., program 1 and program 2, are provided to respective transcoders 620 and 630. One or several bitstreams and transcoders may be present. The bitstreams may be received real-time at the transcoders from a remote source, such as via a satellite broadcast, or may be provided from a local storage medium, for example.

The transcoders 620, 630 partially decompress the respective bitstreams, and encode the partially decompressed data at a different data rate, typically by using a different quantization parameter, according to a target bit rate signal provided by a rate control processor 605.

The rate control processor 605 receives information from the transcoders, including the picture type of the current picture, and the quantization parameter used to encode the current picture. This information is processed as described herein to set the target bit rates. The rate control processor 605 may include known processing circuitry, such as a central processing unit (CPU) 612, and a memory 614. The memory 614 may be a non-volatile memory that stores data, for example, for providing the initial distances M' and N' discussed previously. The rate control processor includes computing circuitry for executing the C-language like pseudo-code discussed previously.

A user interface 608 may communicate with the rate control processor 605 to set the default distances M' and N' or other relevant parameters in the rate control process.

The transcoded data from the transcoders 620, 630 is provided to a multiplexer (MUX) 660, and then to an encoder buffer 670. A buffer fullness signal is provided from the encoder buffer 670 to the rate control processor 605. The encoded data is finally transmitted over a channel at its new transcoded data rate.

5. Conclusion

A novel rate control system suitable for use with a digital video transcoder, such as one conforming to the MPEG standard, has been presented. The proposed rate control causes no processing delay and requires no extra memory. It can start with any reasonable set of GOP parameters, and then gradually corrects them when necessary as successive pictures are coded. Hence, it is able to address changes in the GOP structure of pre-compressed bitstreams, for example, when switching channels, inserting commercials, and the like. It has been shown that the target rates with correct and incorrect starting GOP parameters will converge within one or two GOPs. The differences in target rates are within a fairly small margin. Moreover, similar target rates correspond to a similar PSNR or picture quality.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for allocating bits for coding pictures in a bitstream received at a digital video transcoder, comprising the steps of:
    (a) providing an assumed distance M' between a first picture of said bitstream and the next closest subsequent P-picture of said bitstream in a display order of said bitstream;
    (b) providing an assumed bit budget as a function of said assumed distance M';
    (c) coding said first picture in accordance with said assumed bit budget;
    (d) determining a picture type of a second picture that immediately follows said first picture in said bitstream in an encoding order of said bit stream;
    (e) adjusting said assumed bit budget according to said picture type of said second picture; and
    (f) allocating bits for coding said second picture in accordance with said adjusted bit budget;
       wherein said pictures in said bitstream form a progressive refresh sequence which does not contain I-pictures.

2. The method of claim 1, wherein:
said assumed bit budget is proportional to said assumed distance and a bit rate of said bitstream, and inversely proportional to a frame rate of said bitstream.

3. The method of claim 1, wherein said first picture is a P-picture and said second picture is a B-picture, comprising the further step of:
determining an actual distance M" between said first picture and said next closest subsequent P-picture, in said display order, according to said picture type of said second picture.

4. The method of claim 3, wherein:
said actual distance M" is determined according to a difference between a temporal reference of said second picture, in said display order, and a temporal reference of said first picture, in said display order, plus one picture.

5. The method of claim 3, comprising the further step of:
allocating bits for coding the remaining M"−1 pictures following said first picture in accordance with said adjusted bit budget.

6. The method of claim 3, wherein:
said adjusting step (e) comprises the step of adjusting said assumed bit budget by +(M"−M')*"bit rate"/"frame rate", where "bit rate" is a bit rate of said bitstream, and "frame rate" is a frame rate of said bitstream.

7. The method of claim 1, wherein said first and second pictures are P-pictures, comprising the further step of:
determining an actual distance M" between said first picture and said next closest subsequent P-picture, in said display order, according to said picture type of said second picture.

8. The method of claim 7, wherein:
said actual distance M" is determined according to a difference between a temporal reference of said second picture, in said display order, and a temporal reference of said first picture, in said display order.

9. The method of claim 7, wherein said adjusting step (e) comprises the step of:
adjusting said assumed bit budget by −(M'−1)*"bit rate"/"frame rate", where "bit rate" is a bit rate of said bitstream, and "frame rate" is a frame rate of said bitstream.

10. The method of claim 8, comprising the further step of:
allocating bits for coding the remaining M"−1 pictures following said first picture in accordance with said adjusted bit budget.

11. The method of claim 1, comprising the further step of:
allocating bits for coding a series of M" pictures following an initial M" pictures that includes said first and second pictures in said bitstream in accordance with said adjusted bit budget.

12. An apparatus for allocating bits for coding pictures in a bitstream received at a digital video transcoder, comprising:
    (a) means for providing an assumed distance M' between a first picture of said bitstream and the next closest subsequent P-picture of said bitstream in a display order of said bitstream;
    (b) means for providing an assumed bit budget as a function of said assumed distance M';
    (c) means for coding said first picture in accordance with said assumed bit budget;
    (d) means for determining a picture type of a second picture that immediately follows said first picture in said bitstream in an encoding order of said bit stream;
    (e) means for adjusting said assumed bit budget according to said picture type of said second picture; and
    (f) means for allocating bits for coding said second picture in accordance with said adjusted bit budget;
       wherein said pictures in said bitstream form a progressive refresh sequence which does not contain I-pictures.

13. The apparatus of claim 12, wherein:
said assumed bit budget is proportional to said assumed distance and a bit rate of said bitstream, and inversely proportional to a frame rate of said bitstream.

14. The apparatus of claim 12, wherein said first picture is a P-picture and said second picture is a B-picture, further comprising:
means for determining an actual distance M" between said first picture and said next closest subsequent P-picture, in said display order, according to said picture type of said second picture.

15. The apparatus of claim 14, wherein:
said actual distance M" is determined according to a difference between a temporal reference of said second picture, in said display order, and a temporal reference of said first picture, in said display order, plus one picture.

16. The apparatus of claim 14, further comprising:

means for allocating bits for coding the remaining M"−1 pictures following said first picture in accordance with said adjusted bit budget.

17. The apparatus of claim 14, wherein:

said adjusting means (e) comprises means for adjusting said assumed bit budget by +(M"−M')*"bit rate"/"frame rate", where "bit rate" is a bit rate of said bitstream, and "frame rate" is a frame rate of said bitstream.

18. The apparatus of claim 12, wherein said first and second pictures are P-pictures, further comprising:

means for determining an actual distance M" between said first picture and said next closest subsequent P-picture, in said display order, according to said picture type of said second picture.

19. The apparatus of claim 18, wherein:

said actual distance M" is determined according to a difference between a temporal reference of said second picture, in said display order, and a temporal reference of said first picture, in said display order.

20. The apparatus of claim 18, wherein said adjusting means (e) comprises:

means for adjusting said assumed bit budget by −(M'−1)*"bit rate"/"frame rate", where "bit rate" is a bit rate of said bitstream, and "frame rate" is a frame rate of said bitstream.

21. The apparatus of claim 18, further comprising:

means for allocating bits for coding the remaining M"−1 pictures following said first picture in accordance with said adjusted bit budget.

22. The apparatus of claim 12, further comprising:

means for allocating bits for coding a series of M" pictures following an initial M" pictures that includes said first and second pictures in said bitstream in accordance with said adjusted bit budget.

* * * * *